United States Patent
Meyerson et al.

(10) Patent No.: US 6,669,093 B1
(45) Date of Patent: *Dec. 30, 2003

(54) HAND-HELD DATAFORM READER HAVING MULTIPLE TARGET AREA ILLUMINATION SOURCES FOR INDEPENDENT READING OF SUPERIMPOSED DATAFORMS

(75) Inventors: Robert F. Meyerson, Captiva Island, FL (US); Chen Feng, Bothell, WA (US)

(73) Assignee: Telxon Corporation, Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/994,821

(22) Filed: Dec. 19, 1997

(51) Int. Cl.$^7$ ................................. G06K 7/10
(52) U.S. Cl. ............... 235/472.01; 235/462.45; 235/468; 235/491; 250/271
(58) Field of Search ............... 235/454, 462.2, 235/462.21, 462.07, 462.25, 462.42, 462.45, 462.46, 468, 472.01, 472.02, 491, 462.01, 494; 250/271, 566, 568; 382/183, 227, 312, 318

(56) References Cited

U.S. PATENT DOCUMENTS

| | | | | |
|---|---|---|---|---|
| 3,492,478 A | * | 1/1970 | Smith ..................... 250/271 |
| 3,500,047 A | * | 3/1970 | Berry ..................... 250/271 |
| 3,663,813 A | * | 5/1972 | Shaw ..................... 250/271 |
| 4,160,902 A | * | 7/1979 | van Wijngaarden 235/462.06 X |
| 4,210,802 A | | 7/1980 | Sakai ..................... 235/483 |
| 4,889,367 A | * | 12/1989 | Miller ............... 235/462.07 X |
| 4,983,817 A | * | 1/1991 | Dolash et al. .......... 235/491 X |
| 5,010,580 A | | 4/1991 | Vincent et al. .......... 382/163 |
| 5,019,699 A | * | 5/1991 | Koenck ................. 235/472.01 |
| 5,135,160 A | * | 8/1992 | Tasaki ................. 235/462.42 |
| 5,278,397 A | | 1/1994 | Barkan et al. ......... 235/462.49 |
| 5,401,960 A | * | 3/1995 | Fisun et al. ............. 250/271 |
| 5,408,084 A | | 4/1995 | Brandorff et al. ........ 250/208.1 |
| 5,502,304 A | * | 3/1996 | Berson et al. ............. 250/271 |
| 5,504,316 A | | 4/1996 | Bridgelall et al. ...... 235/462.07 |
| 5,506,392 A | * | 4/1996 | Barkan et al. ......... 235/462.46 |
| 5,525,798 A | * | 6/1996 | Berson et al. ............. 250/271 |
| 5,532,104 A | * | 7/1996 | Goto ..................... 235/491 X |
| 5,532,467 A | * | 7/1996 | Roustaei ................ 235/472.01 |
| 5,642,442 A | * | 6/1997 | Morton et al. ......... 382/227 X |
| 5,717,195 A | * | 2/1998 | Feng et al. ............... 235/470 |
| 5,773,808 A | * | 6/1998 | Laser .................... 235/462.42 |
| 5,793,033 A | * | 8/1998 | Feng et al. ............ 235/472.01 |
| 5,814,806 A | * | 9/1998 | Tanaka et al. .............. 235/494 |

(List continued on next page.)

FOREIGN PATENT DOCUMENTS

| | | | |
|---|---|---|---|
| JP | 60-129891 | | 7/1985 |
| JP | 63-184180 A | * | 7/1988 |
| JP | 1-276283 A | * | 11/1989 |
| JP | 5-242287 | | 9/1993 |

OTHER PUBLICATIONS

Metanetics Corporation, "IR–2000 Hand Held Image Reader User's Guide," release date Jan. 1997.

*Primary Examiner*—Jared J. Fureman
(74) *Attorney, Agent, or Firm*—Watts Hoffmann Co., L.P.A.

(57) ABSTRACT

A portable data collection device having a modular imaging-based dataform reader. The dataform reader is adapted to independently read first and second overlying dataforms, the first dataform is imaged and decoded when illuminated by radiation having a first wavelength and the second dataform is imaged and decoded when illuminated by radiation having a second wavelength. Control and selection circuitry is electrically coupled to an imaging assembly and an illumination assembly to actuate the imaging assembly and selectively energize a first illumination source which generates radiation having a first range of wavelengths to image and decode the first dataform while a second illumination source is deenergized and to actuate the imaging assembly and selectively energize the second illumination source which generates radiation having a second range of wavelengths to image and decode the second dataform while the first illumination source is deenergized.

26 Claims, 15 Drawing Sheets

U.S. PATENT DOCUMENTS

| | | | | |
|---|---|---|---|---|
| 5,861,618 A | * | 1/1999 | Berson | 235/468 |
| 5,920,061 A | * | 7/1999 | Feng | 235/472.01 |
| 5,959,296 A | * | 9/1999 | Cyr et al. | 250/271 |
| 5,971,276 A | * | 10/1999 | Sano et al. | 235/468 X |
| 5,992,753 A | * | 11/1999 | Xu | 235/472.01 |
| 6,039,257 A | * | 3/2000 | Berson et al. | 235/468 |
| 6,123,263 A | * | 9/2000 | Feng | 235/462.42 |
| 6,354,501 B1 | * | 3/2002 | Outwater et al. | 235/462.01 |

* cited by examiner

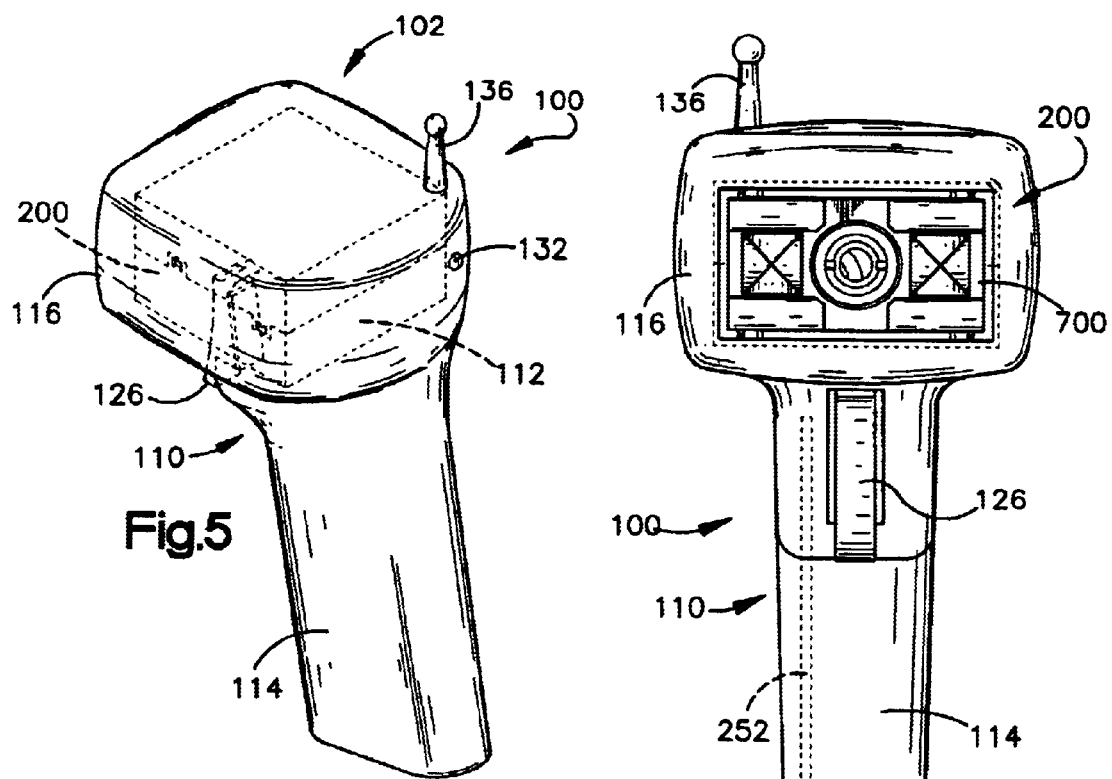
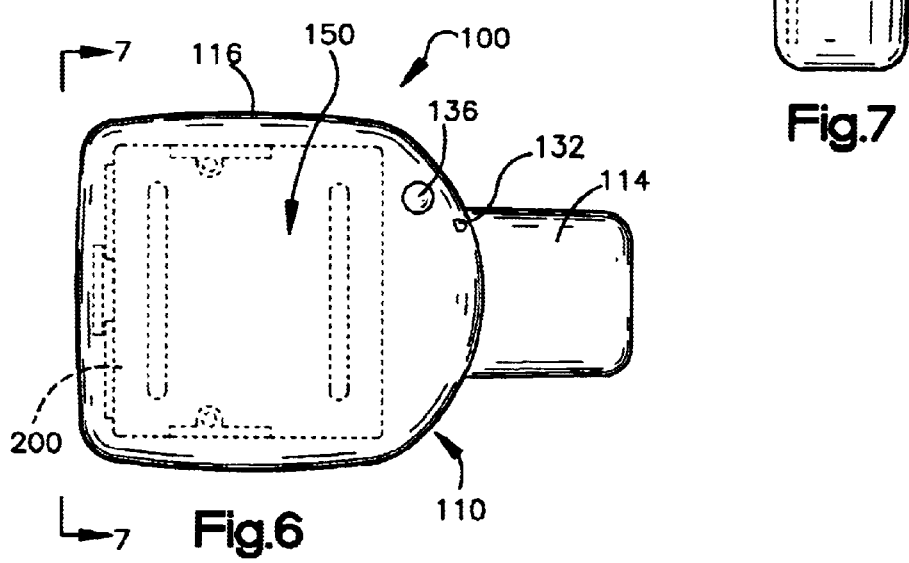

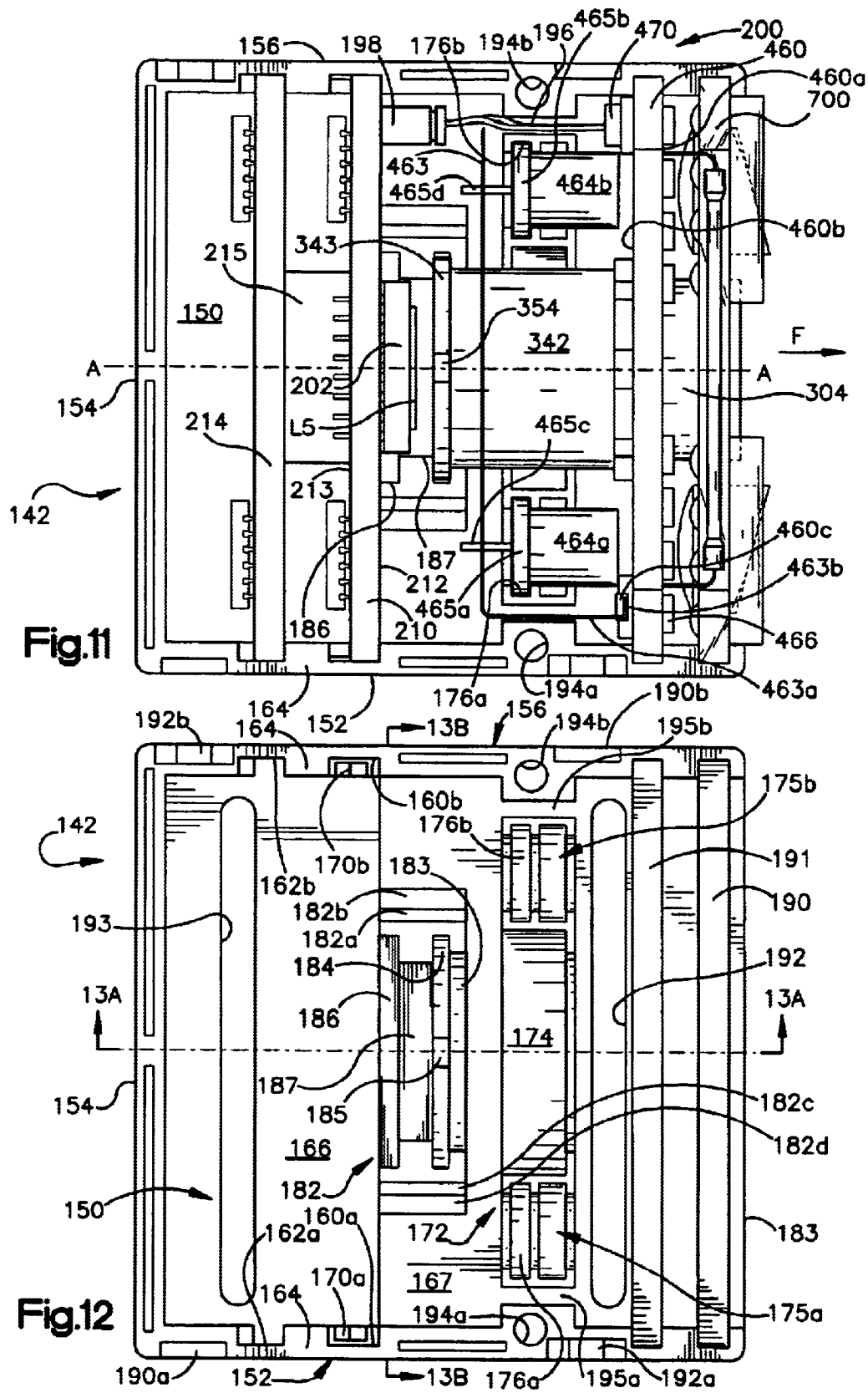

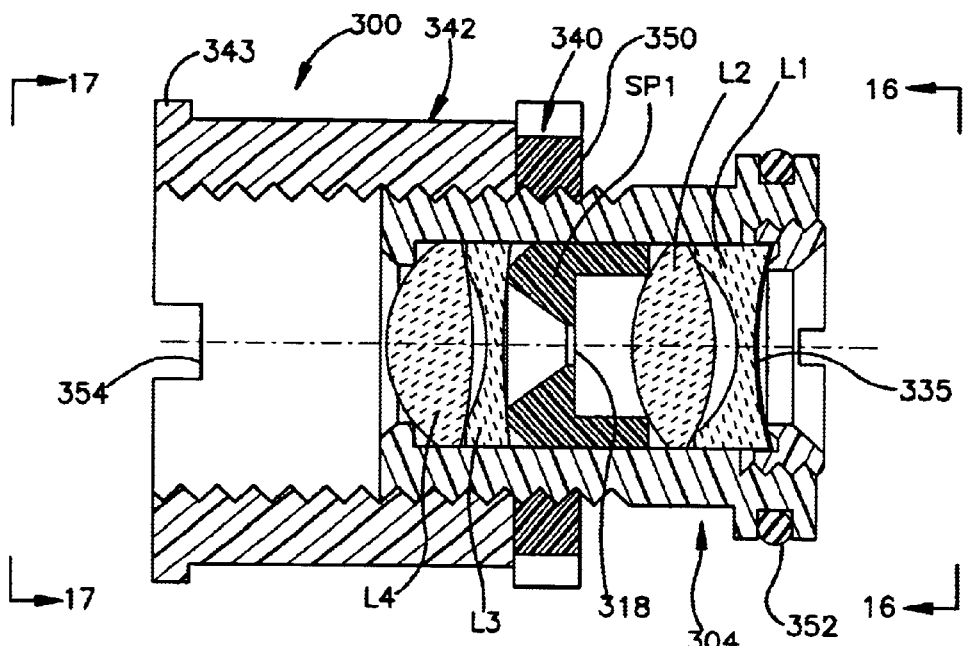
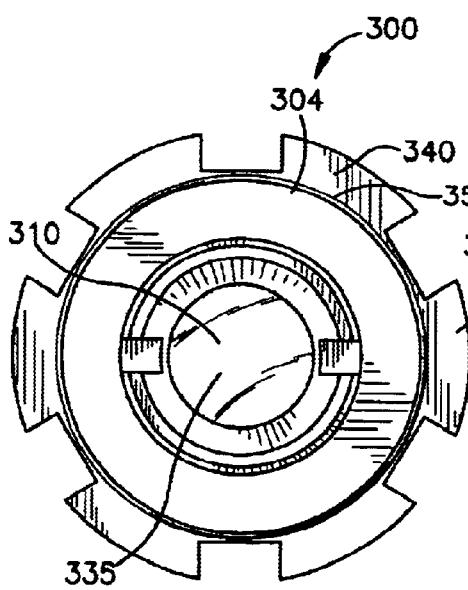 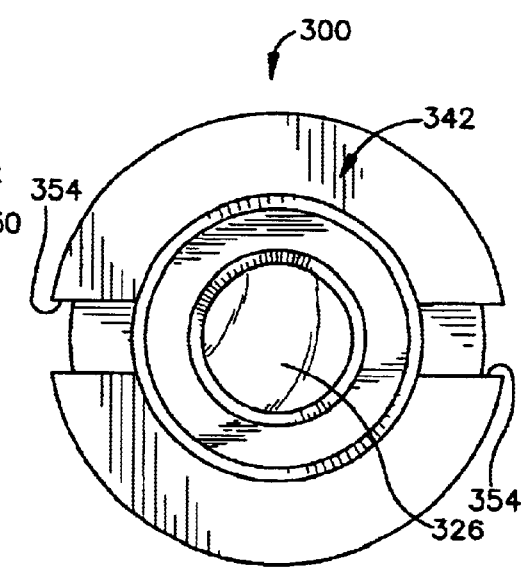

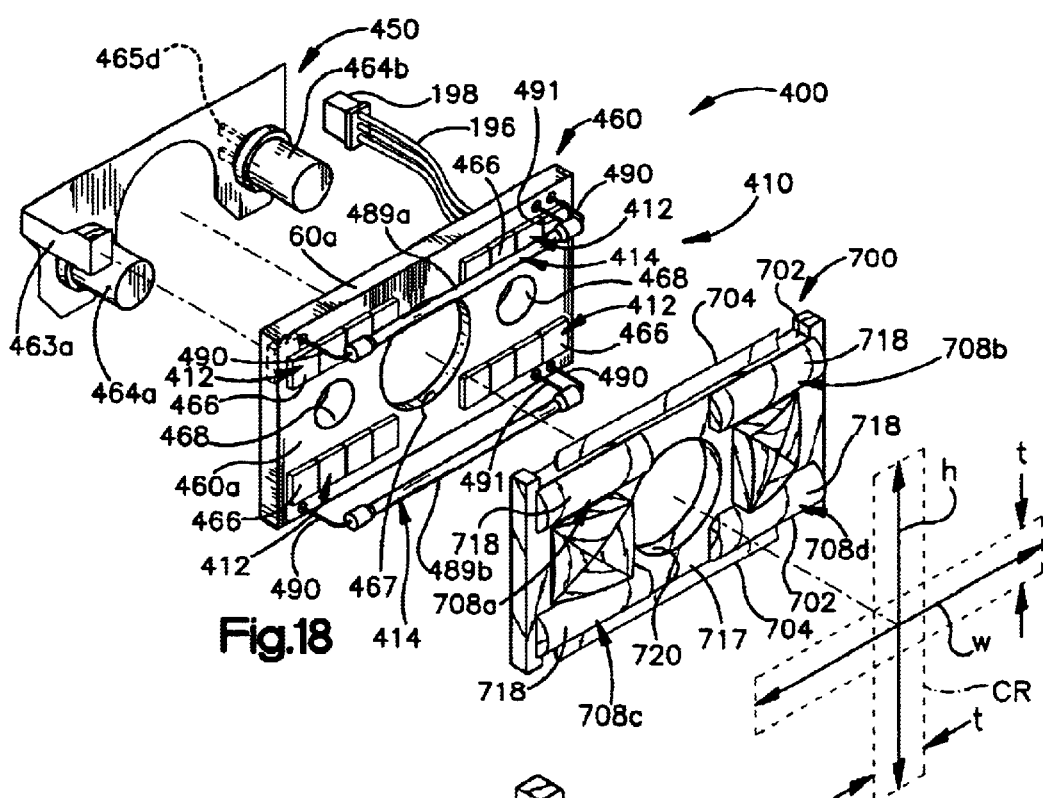
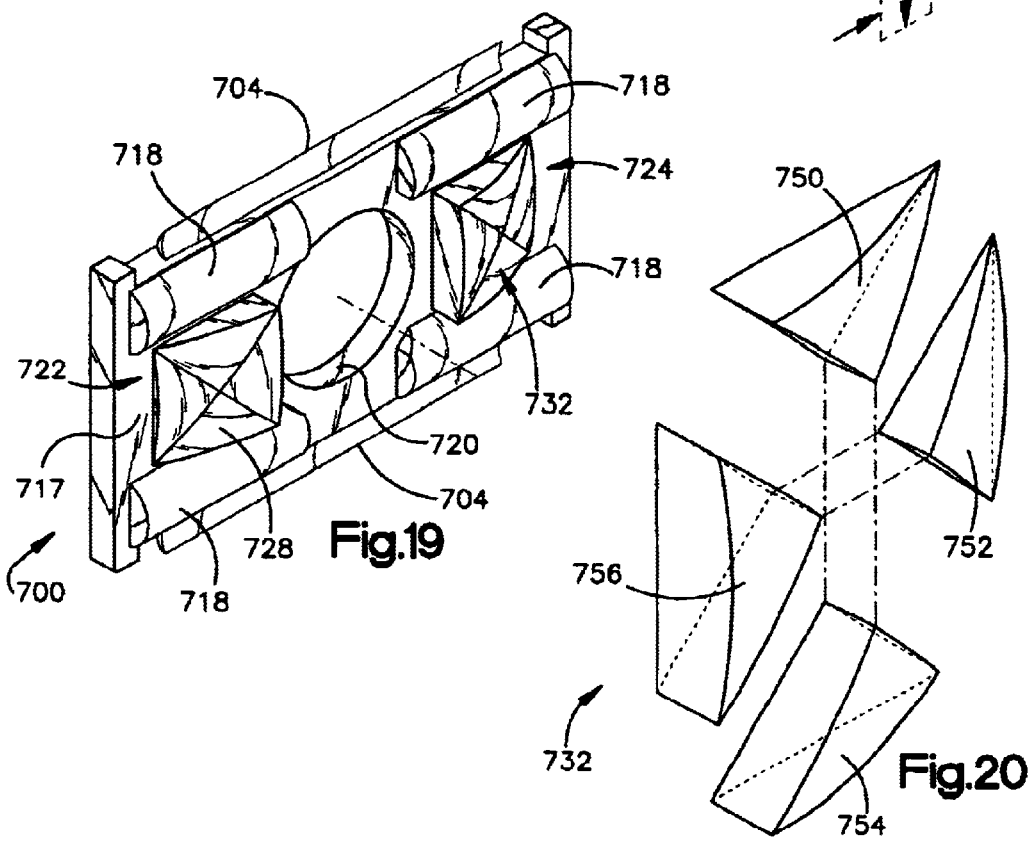

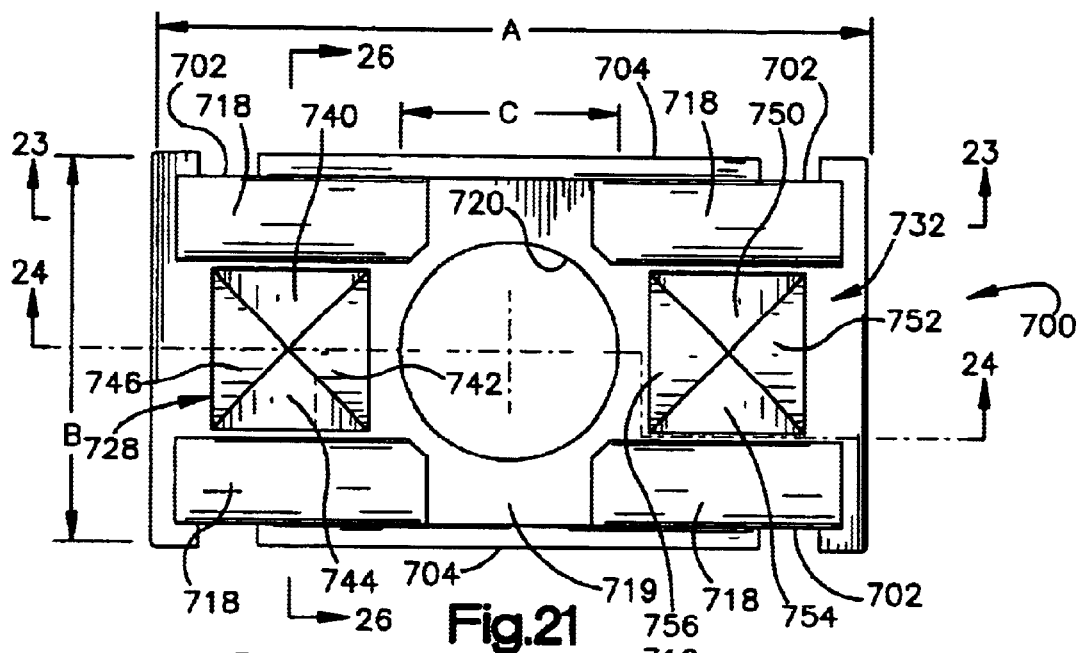
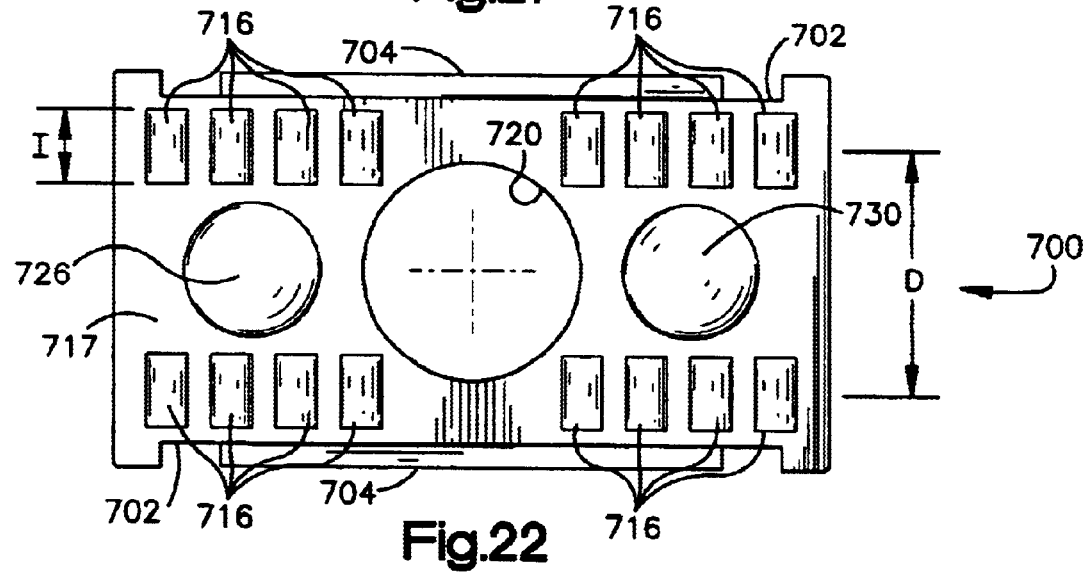
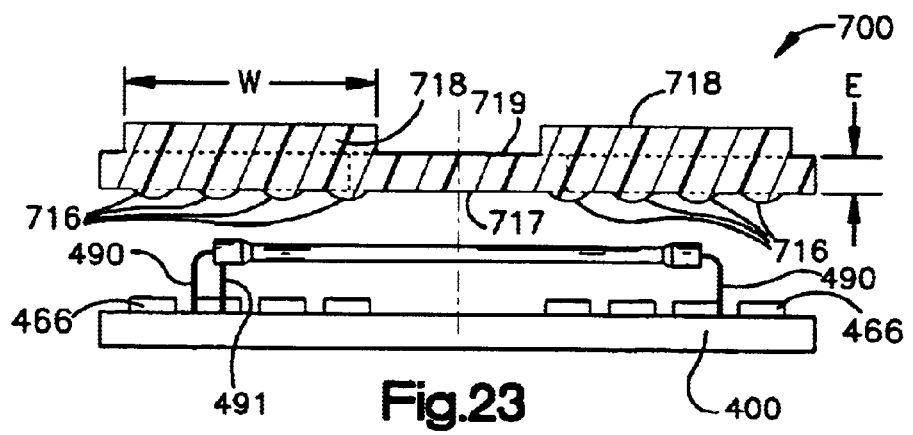

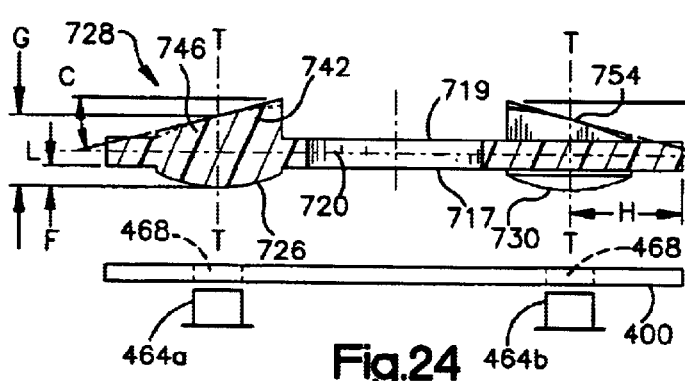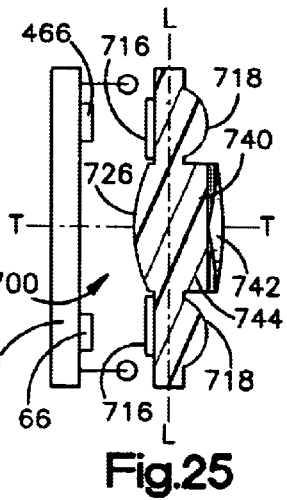
Fig.24    Fig.25
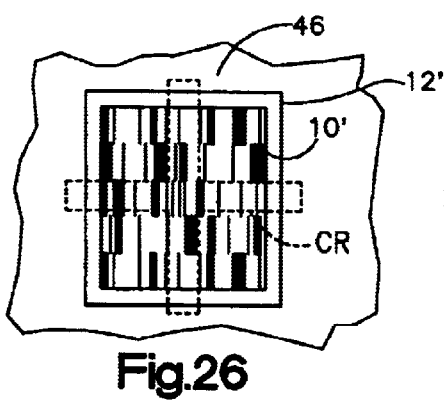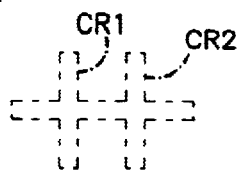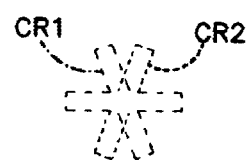
Fig.26    Fig.27    Fig.28

HAND-HELD DATAFORM READER HAVING MULTIPLE TARGET AREA ILLUMINATION SOURCES FOR INDEPENDENT READING OF SUPERIMPOSED DATAFORMS

FIELD OF THE INVENTION

The present invention relates to a portable data collection device including an imaging-based dataform reader and, more particularly, to a portable data collection device including an imaging based dataform reader utilizing multiple target area illumination sources for independent reading of superimposed dataforms.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both laser scanners and CCD imaging assemblies are also capable of reading a "stacked" two dimensional (2D) bar code dataforms, such as PDF417, which is comprised of a plurality of adjacent rows of bar code data. The stacked 2D bar code PDF417 includes row indicator patterns utilized by the dataform reader for vertical synchronization to permit reading successive rows of bar code data.

A two dimensional (2D) imaging based dataform reader has been proposed in U.S. Pat. No. 5,702,059, issued Dec. 30, 1997 and entitled "Extended Working Range Dataform Reader Including Fuzzy Logic Image Control Circuitry." The 2D dataform reader disclosed in U.S. Pat. No. 5,702,059, which is assigned to the assignee of the present application, includes an imaging assembly having a two dimensional array of photosensors adapted to read 2D bar code dataforms (e.g., PDF417, SuperCode, etc.) with vertical synchronization row indicator patterns as well as matrix dataforms (e.g., MaxiCode, DataMatrix, etc.) which do not include vertical synchronization patterns. The individual photosensors correspond to image picture elements or pixels of the resulting image generated with the photosensors are read out after an exposure period or periods. The 2D dataform reader disclosed in U.S. Pat. No. 5,702,059 utilizes an open loop feedback control system including fuzzy logic circuitry to determine proper exposure time and gain parameters for a camera assembly. U.S. Pat. No. 5,702,059 is incorporated in its entirety herein by reference.

Two dimensional and matrix dataforms have a greater density of encoded data per unit area than 1D dataforms. However, even with 2D and matrix dataforms, there are limitations on the amount of data that can be encoded in a dataform applied to or imprinted on an item. First, there are limitations on the area of a product or a product's packaging where a label imprinted with a dataform may be affixed or where a dataform may be directly imprinted. For certain items, any portion of the item may be acceptable for application of a dataform, thus, the acceptable area for dataform application is limited to the size of the item. However, for other items, the acceptable area for application of a dataform may be limited to a certain region having a generally flat surface suitable for label application or imprinting of a dataform. Second, a dataform reader is limited by a minimum cell size required by the reader. The minimum cell size of a dataform reader is the required size of the smallest individually readable portions of a dataform to be read by the dataform reader. If the minimum cell size of a dataform is less than the minimum cell size capable of being read by the dataform reader, successful decoding of the dataform is not possible.

In an imaging based dataform reader, the minimum cell size capable of being read is a function of a number of factors including the optic assembly and the illumination assembly of the reader. Generally, the smaller the minimum cell size required to be read by a dataform reader, the better the quality of the optics of the optic assembly will be need to properly focus a non-distorted image of the target area of the reader onto the photosensor array. Consequently, the smaller the minimum cell size that is required to be read, generally, the more expensive the optic assembly will be. Similarly, the smaller the minimum cell size that is required to be read, the more powerful and more focused the illumination assembly must be to provide an adequate intensity of illumination across the entirety of the target area of the reader. Again, the smaller the minimum cell size that is required to be read, generally, the more expensive the illumination assembly will be.

What is need is a method of generating a dataform having a high density of encoded data per unit area of the dataform but also having an acceptably large minimum cell size so that the need for an expensive optic assembly and illumination assembly to read target dataforms is ameliorated. What is further needed is a dataform reader capable of reading such a dataform without undue expense or the necessity of radically changing the imaging assembly from what is known in the art.

SUMMARY OF THE INVENTION

In accordance with this invention, a portable data collection device is provided with a two dimensional imaging assembly including a modular board camera providing for independent reading, that is, imaging and decoding, of superimposed dataforms. The dataform reader is provided with a targeting and illumination assembly comprising two illumination or radiation sources, each illumination source providing illumination in a different range of the electromagnetic spectrum. In a first preferred embodiment, the first illumination source provides illumination in the visible range, e.g., radiation having a wavelength range centered at about 6600 Angstrom or 660 nanometers (nm.) corresponding to the visible spectrum of light. The second illumination source provides illumination in the ultraviolet range of the electromagnetic spectrum, e.g., radiation having a wavelength range centered within the ultraviolet range which extends between about 200 Angstrom or 20 nm. to 3800 Angstrom or 380 nm.

The superimposed dataforms are printed on a substrate in a dataform area. The dataform area may be a label which is affixed to a product or a product's packaging. In such a case, the dataform area substrate on which the superimposed dataforms are printed would be the label material. In other cases the superimposed dataforms may be imprinted directly on an area of the product or the product's packaging. In these cases, the dataform area substrate would be the portion of the product or product packaging where the dataforms are printed. In accord with the present invention, two superimposed dataforms will be printed on a substrate in the dataform area. A first dataform will be printed on the substrate in the dataform area using a first pigment or ink for the printed cell portions of the first dataform and a second dataform will be printed on substrate in the dataform area using a second pigment or ink for the printed cell portions of the second dataform.

The ink used for the printed cell portions of the first dataform is a visible, non-carbon ink, that is, ink that absorbs light in the visible spectrum and does not absorb ultraviolet light. The ink used for the printed cell portions of the second dataform is an ultraviolet active ink, that is, ink that fluoresces upon being illuminated by ultraviolet light. When ultraviolet active ink fluoresces, it emits lights in the visible spectrum.

The imaging assembly of the present invention includes a modular board camera assembly having a two dimensional (2D) photosensor array, an optic assembly for focusing an image of the target area onto the photosensor array and the illumination assembly. In addition to providing multiple illumination sources to successively illuminate the target area, the targeting and illumination assembly also includes a targeting assembly to provide targeting illumination for focusing visible targeting illumination on the target area to aid a user in aiming the device.

In the preferred embodiment, the modular board camera assembly includes circuitry generating an analog composite video signal. The 2D sensor array is a charge coupled device (CCD) comprised of a two dimensional matrix of photosensors. The composite analog video signal generated by the modular board camera assembly represents successive image frames of the imaging assembly target area. The composite video signal is converted by signal processing circuitry to a stream of eight bit digital gray scale values.

Upon instituting a dataform reading session, the targeting illumination assembly and the first visible illumination source are alternately energized to enable the operator to aim the device and simultaneously capture image frames of the target area wherein the target area is uniformly illuminated and does not include "hot spots" of illumination in the target area caused by the narrowly focused targeting illumination. Reflected illumination from the dataform corresponding to the pattern of the first dataform is focused onto the photosensor array. To avoid image distortion, the targeting illumination assembly is turned off so that image frames without reflected targeting illumination are generated. Decoding will be attempted on such a non-distorted image frame.

A portion of the set of gray scale values corresponding to the first captured image frame is converted by binarization and zoning circuitry into a set of binary (0,1) values in accord with a binarization algorithm. Working from a center of the image area outwardly, the circuitry identifies the binary values corresponding to the first dataform. The binary values corresponding to the imaged visible light dataform are operated on by cell extraction circuitry. The cell extraction circuitry generates cell extraction values which correspond to an image of the first dataform area. Decoding circuitry then operates on the cell extraction values to decode the first dataform.

Upon successful imaging and decoding of a captured image frame having an image of the first dataform, the first illumination source is deenergized and the second ultraviolet illumination source is energized. As with the first illumination source, the second ultraviolet illumination source and the targeting illumination assembly are alternately energized and to enable the operator to aim the reader and simultaneously capture image frames of the target area wherein the target area is uniformly illuminated and does not include "hot spots" of illumination in the target area caused by the narrowly focused targeting illumination. The ultraviolet light causes the ultraviolet active ink portions of the dataform to fluoresce and emit visible illumination. This illumination pattern resulting from the fluorescence corresponds to a "negative" of the pattern of the second dataform. The illumination pattern is focused onto the photosensor array. Once again, to avoid image distortion, the targeting illumination assembly is turned off so that image frames without reflected targeting illumination are generated and decoding will be attempted on such a non-distorted image frame.

As before, the binarization and zoning circuitry convert a portion of the set of gray scale values corresponding to the second captured image frame into a set of binary (0,1) values in accord with the binarization algorithm. Working from a center of the image area outwardly, the circuitry identifies the binary values corresponding to the imaged UV light dataform. The binary values corresponding to the UV light dataform are operated on by the cell extraction and the decoding circuitry, as set forth above, to decode the UV light dataform. Upon successful imaging and decoding of a captured image frame having an image of the second dataform, the second illumination source is deenergized.

These and other objects, features and advantages of the invention will become better understood from the detailed description of the preferred embodiments of the invention which are described in conjunction with the accompanying drawings.

BRIEF DESCRIPTION OF THE DRAWINGS

FIG. 5 is a perspective view of a portable data collection device of the present invention;

FIG. 6 is a top view of the portable data collection device of FIG. 1;

FIG. 7 is a front elevation view of the portable data collection device of FIG. 1 as seen from a plane indicated by the line 7–7 in FIG. 6;

FIG. 11 is a top plan view of a the modular camera assembly of FIG. 8 with an upper half of the housing removed as seen from a plane indicated by the line 11—11 in FIG. 10;

FIG. 12 is a top plan view of a lower half of the modular camera assembly housing as seen in FIG. 11 with the modular camera assembly components removed;

FIG. 15 is a view, partially in side elevation and partially in section of the optic assembly of the modular camera assembly;

FIG. 16 is a front elevation view of the optic assembly of the modular camera assembly as seen from a plane indicated by the line 16—16 in FIG. 15;

FIG. 17 is a rear elevation view of the optic assembly of the modular camera assembly as seen from a plane indicated by the line 17—17 in FIG. 15;

FIG. 18 is an exploded perspective view of a targeting and illumination assembly of the modular camera assembly of the imaging assembly of the present invention;

FIG. 19 is a perspective view of a lens array or front panel of the illumination assembly of FIG. 18;

FIG. 20 is an exploded perspective view of a targeting optics of the front panel of FIG. 19;

FIG. 21 is a front elevation view of the front panel of FIG. 19;

FIG. 22 is a back elevation view of the front panel of FIG. 19;

FIG. 23 is a sectional view of the front panel of FIG. 32 as seen from a plane indicated by the line 23—23 in FIG. 21;

FIG. 24 is a sectional view of the front panel of FIG. 19 as seen from a plane indicated by the line 24—24 in FIG. 21;

FIG. 25 is a sectional view of the front panel of FIG. 19 as seen from a plane indicated by the line 25—25 in FIG. 21;

FIG. 26 is a representation of a crosshair illumination pattern generated by the illumination assembly of FIG. 18 superimposed on a target two dimensional bar code dataform;

FIG. 27 is a representation of a separation of crosshair illumination patterns of two targeting optics of the illumination assembly of FIG. 18 caused by imaging with the portable data collection device at a distance from a target object significantly different than a best focus position of the optic assembly of the device;

FIG. 28 is a representation of an angular shift of crosshair illumination patterns of two targeting optics of the illumination assembly of FIG. 18 caused by imaging with the portable data collection device tilted such that the front panel is not substantially parallel to a surface of a target object;

DETAILED DESCRIPTION

Superimposed Composite Dataform 10

Figure 1:
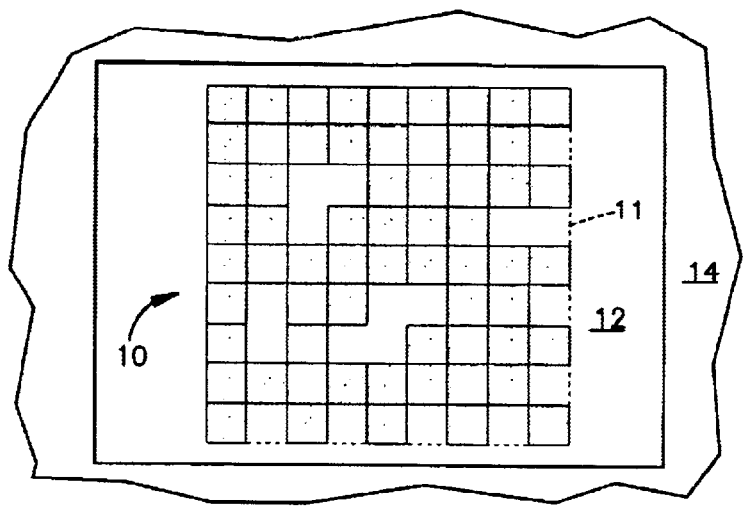
FIG. 1 is a schematic representation of a two dimensional composite matrix dataform imprinted on a label, the composite matrix dataform comprised of two superimposed two dimensional matrix dataforms.

Turning to the drawings, a composite dataform 10 in accordance with the present invention is shown in FIG. 1. The dataform 10 is printed on a dataform area 11 (outlined in dashed line in FIG. 1) of a white or light colored label 12. Preferably, an opposite side of the label 12 includes an adhesive facilitating attachment of the label 12 to a product or a product's packaging 14. The dataform 10 is defined by a square matrix of 9 by 9 cells or spaces (best seen in FIG. 4), each cell being square in shape. The dataform 10 is comprised of a pattern of inked and non-inked cells that results from an overlying or superimposition of two dataforms 16, 18 occupying the same dataform area 11.

Figure 2:
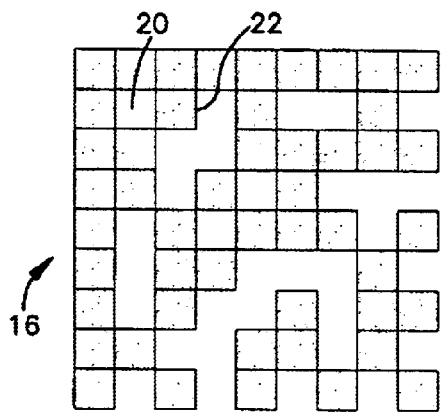
FIG. 2 is a schematic representation of a first dataform of the composite dataform of FIG. 1.
Figure 3:
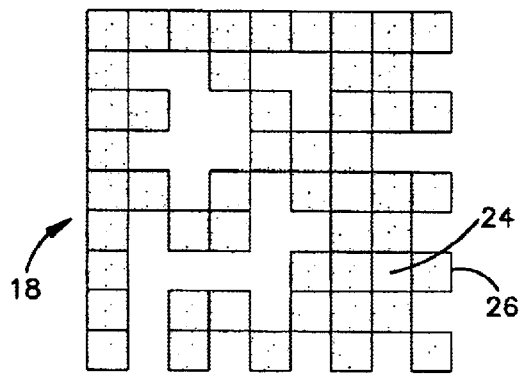
FIG. 3 is a schematic representation of a second dataform of the composite dataform of FIG. 1.

For clarity, the first dataform is shown at 16 in FIG. 2 and an overlying or superimposed second dataform shown at 18 in FIG. 3. The dataforms 16, 18 are schematic representations of DataMatix dataforms. DataMatrix is a binary symbology of International Data Matrix, Inc. of Clearwater, Fla. and is described in U.S. Pat. No. 5,473,151 to Priddy et al. While DataMatrix dataforms are used to illustrate the principals set forth here of generating and reading superimposed or overlying dataforms, it should be appreciated that any dataform, i.e., one dimensional bar code dataforms such as Codabar, Code 39, Code 93, Code 128, Interleaved 2 of 5, and UPC/EAN; two dimensional bar code dataforms such as PDF417 and SuperCode; and matrix dataforms such as MaxiCode and DataMatrix are all amenable to the processes described herein.

The first dataform 16 (FIG. 2) is comprised of a pattern of 9 by 9 square shaped cells which are either inked (dark in color) 20 or non-inked (light in color) 22. An inked cell 20 is generated by applying or imprinting a label area corresponding to the cell with a dark color visible ink or pigment that absorbs light or radiation in the visible spectrum, specifically, light having a wavelength around 660 nm., while a non-inked cell (light-colored cell) 22 results from an absence of ink applied to the cell and, therefore, the light-colored label 12 shows through and reflects visible illumination. The ink used to imprint the inked cells 20 of the first dataform 16 is a non-carbon based dark or black ink.

The second dataform 18 (FIG. 3) is also comprised of a pattern of 9 by 9 square shaped cells which are congruent with the cells of the first dataform 16. The cells of the second dataform 18 are either inked with an ultraviolet active ink 24 or non-inked 26. An ultraviolet active ink is an ink that fluoresces upon being exposed to ultraviolet radiation or light. An inked cell 24 is generated by applying or imprinting a label area corresponding to the cell with the ultraviolet active ink while a non-inked cell 26 results from an absence of ink applied to the cell. An acceptable ultraviolet active ink is product no. A109461 ink produced by UVP, Inc. of Upland, Calif. 91786. This ink has an excitation peak wavelength of 365 nm. (UV long) and an emission wavelength maximum at 500 nm. (green color emission). The ink fluoresces when the ink is excited by radiation or illumination having a wavelength of around 365 nm. and emits radiation or illumination having a range of wavelengths, the wavelengths of the emitted radiation being centered about a value of about 500 nm. Another acceptable ultraviolet active ink is product no. 16.5420 ink produced by VideoJet Corp. of Wood Gale, Ill. 60191-1073. This ink has an excitation wavelength range of 350–510 mn. and an emission wavelength range of 580–605 mm.

Figure 4:
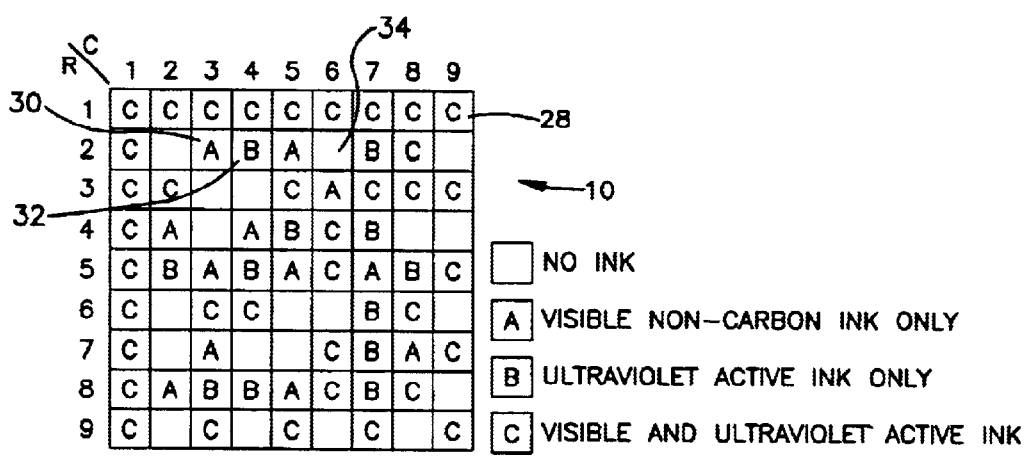
FIG. 4 is a schematic representation of the composite dataform of FIG. 1 showing the ink or combination of inks applied to each cell.

FIG. 4 shows a schematic representation of the pattern of inked and non-inked cells of the combined dataform 10. The cell rows and columns of the dataform 10 have been numbered. A code indicates whether each cell is non-inked, imprinted with a dark, visible non-carbon ink, and/or imprinted with an ultraviolet active ink. For example, a cell labeled 28 at the intersection of row 1, column 9 is imprinted with both the visible ink and ultraviolet active ink. A cell labeled 30 at the intersection of row 2, column 3 is imprinted with visible ink only. A cell labeled 32 at the intersection of row 2, column 4 is imprinted with ultraviolet ink only. Finally, a cell labeled 34 at the intersection of row 2, column 6 is imprinted with no ink.

Portable Data Collection Device 100

A portable, hand held data collection device in accordance with the present invention is shown generally at 100 in FIGS. 5–12. The portable data collection device includes a housing 110 supporting a two dimensional (2D) charge coupled device (CCD) photosensor array imaging assembly 102. The imaging assembly 102 is capable of independently reading, that is, imaging and decoding each of the first and second dataforms 16, 18 of the composite dataform 10 when the dataform 10 is located within an imaging target area 104 of the imaging assembly 102.

The imaging assembly 102 includes a modular board camera assembly 200 and signal and image processing circuitry 250 mounted on a control and decoder board 252. The control and decoder board 252 is electrically coupled to electronic circuitry 201 of the modular board camera assembly 200.

The board camera assembly 200 includes an optic assembly 300 and a targeting and illumination assembly 400. The optic assembly 300 focuses light from the target area 104 onto a two dimensional photosensor array 202 of the modular board camera assembly 200 while the targeting and illumination assembly 400 includes an illumination assembly 410 providing illumination of the target area 104 and a targeting illumination assembly 450 providing targeting illumination for to aid in aiming the device 100 at the dataform 10.

As indicated above, the target dataform 10 is imprinted on a label 12 affixed to a product or product packaging 14 and the device 100 is appropriately aimed at the packaging 14 such that the dataform 10 is within the target area 104. The imaging assembly 102 of the present invention operates to independently image and decode the first and second dataforms 16, 18 comprising the target dataform 10 when the imaging assembly 102 is actuated and the dataform is in the target area 104. The illumination assembly 410 of the present invention is novel in that it includes two illumination sources, a visible light source 412 and an ultraviolet light source 414.

As will be explained below, the first dataform 16 is imaged when the visible light source 412 is energized to direct illumination on the target area 104 and the second dataform 18 is imaged when the ultraviolet light source 414 is energized to direct illumination on the target area 104. The targeting and illumination assembly 400 also includes the targeting illumination assembly 450 to aid in aiming the device 100 such that the dataform 10 is in the target area 104 of the imaging assembly 102 thereby permitting imaging of the first and second dataforms 16, 18.

Configuration of the Portable Data Collection Device 10

The modular board camera assembly 200 and the control and decoder board 252 are supported in the housing 110 of the portable data collection device 100. The housing 110 which is fabricated of a durable, lightweight polymer material such as high strength polyvinyl chloride. The housing 110 defines an interior region 112. The housing 110 includes a gripping portion 114 sized to be grasped in the hand of an operator and an angled snout 116 extending from the gripping portion 114. With specific reference to FIG. 12, the snout 116 includes an opening through which a portion of the board camera assembly 200 extends. The control and decoder board 252 is supported within the gripping portion 114 of the housing 110. Also supported within the housing gripping portion 114 is a power source 124 such as a rechargeable battery for supplying operating power to the circuitry of the portable data collection device 100 including the signal and image processing circuitry 250 and the board camera circuitry 201. The gripping portion also supports a radio module 140 which is coupled to an antenna 136 extending through an opening in an upper surface of the housing snout 116.

A dataform reading trigger switch or actuator 126 extends through an opening in the gripping portion 114. The dataform reading trigger 126 is positioned to be depressed by an index finger of the operator while the gripping portion 114 of the housing 110 is held in the operator's hand.

The gripping portion 114 also includes a small opening through which a distal portion of an indicator light emitting diode (LED) 132 is visible. The indicator LED 132 alternates between three colors. The color green is displayed by the indicator LED 132 when the device 100 is on standby, ready for use. The color orange is displayed with the device 100 has successfully completed an operation such as imaging and decoding the target dataform 10. The color red is displayed when the device 100 is not ready to perform an operation.

A serial data output port 138 also extends through an opening in the gripping portion 114. The port 138 permits downloading of data stored in a memory 140 (shown schematically in FIG. 29A).

Configuration and Operation of the Imaging Assembly 102

Referring to FIGS. 12 and 13, which show perspective and exploded perspective views of the modular board camera assembly 200 of the imaging assembly 102. It can be seen that the modular board camera assembly 200 includes a housing 220 which supports the optic assembly 300, the targeting and illumination assembly 400 and the board camera circuitry 201. The board camera assembly circuitry 201 includes the two dimensional photosensor array 202 mounted on a surface 212 of a first, frontward printed circuit board 210. The printed circuit board 210 and a second, rearward printed circuit board 214 support the board camera circuitry 210. The board camera assembly 200, when actuated or energized, generates a composite video signal 260 (shown schematically in FIGS. 29A and 29B).

Figure 14:
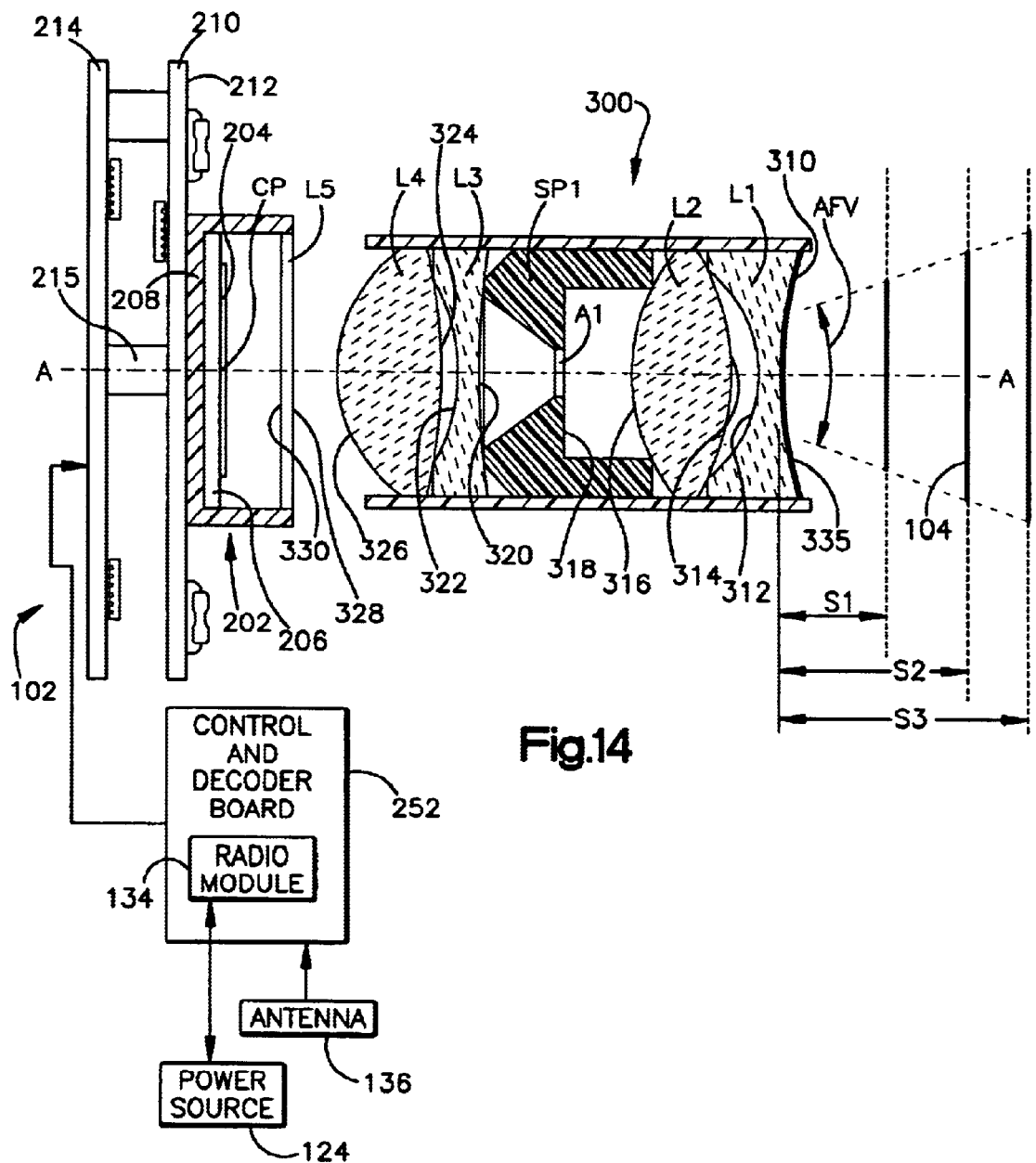
FIG. 14 is a schematic representation of a plurality of lens of an optic assembly of the modular camera assembly.

The modular board camera assembly 200 includes the optic assembly 300 extending from the first printed circuit board 210 which focuses an image of the imaging target area 104 onto the 2D photosensor array 202 (shown schematically in FIG. 14). Specifically, light from the imaging target area 104 is focused by the optic assembly 300 onto an outwardly facing, light receiving surface 204 of the photosensor array 202. The photosensor array 202 is part of a surface mounted integrated circuit (IC) chip 206. The photosensor array IC chip 206 is supported in an IC chip support 208 which is disposed on the front surface 212 (FIG. 9) of the front printed circuit board 210.

Structure of Photosensor Array 202

The photosensor array light receiving surface 204 comprises an array of 584 rows by 752 columns of light sensitive photosensors for a total of 439,168 photosensors in the photosensor array 202. An image of the imaging target area 104 is focused on the light receiving surface 204. Light incident on a photosensor during an exposure period charges the photosensor. Subsequent to the exposure period, the photosensor charge is read out or discharged. The charge magnitude or voltage read out from a photosensor represents an integration of the intensity of the light from the target area 104 focused on the photosensor over the exposure period.

Figure 30:
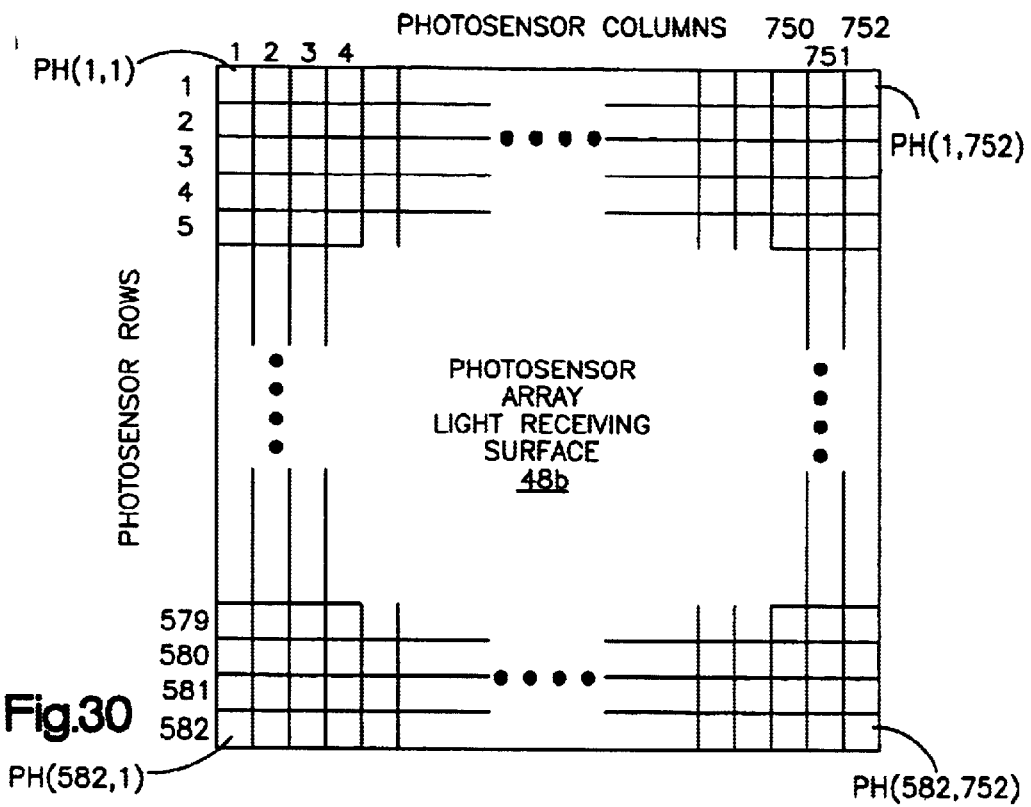
FIG. 30 is a representation of photosensors of the imaging assembly two dimensional photosensor array.
Figure 31:
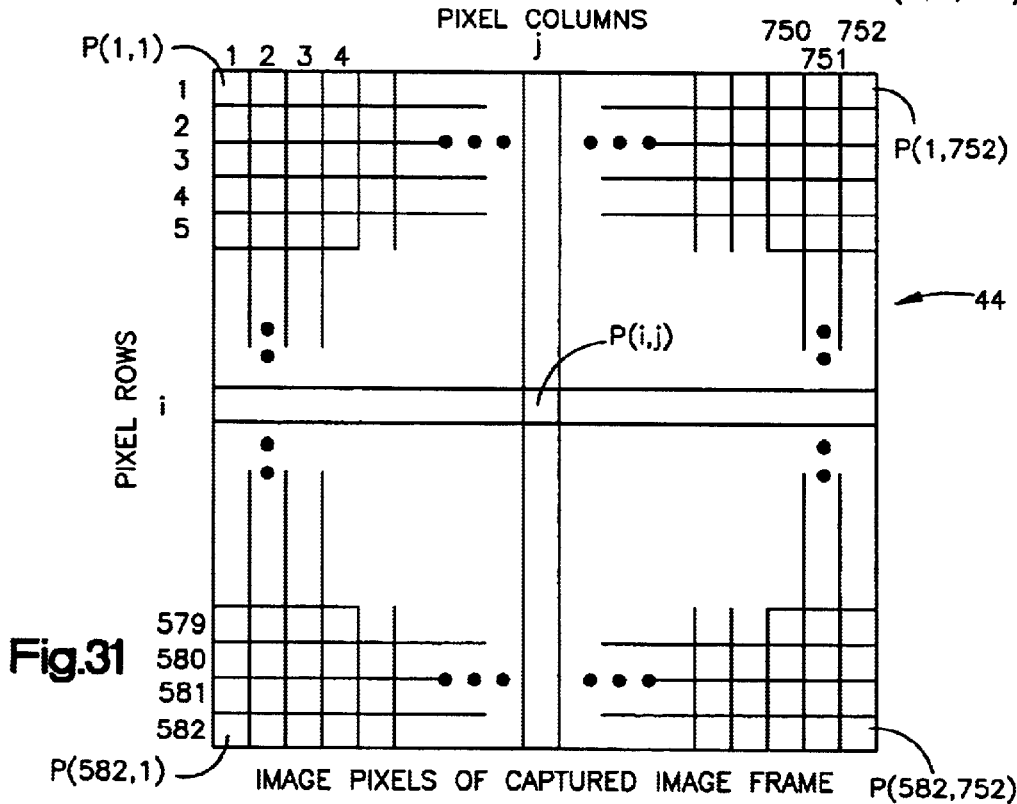
FIG. 31 is a representation of image pixels corresponding to photosensors of the imaging assembly photosensor array.

Each photosensor of the photosensor array 252 corresponds to a picture element or pixel of a captured image field or frame. For example, a representation of the light receiving surface 204 of the photosensor array is shown in FIG. 30. A photosensor labeled PH(1,1) is located at the intersection of photosensor row 1 and photosensor column 1 of the photosensor array 202. The range of photosensor rows ranges from 1 to 582 and the range of photosensor columns ranges from 1 to 752 for a total of 439,168 photosensors. The corresponding set of image pixels for a captured image frame is represented in FIG. 31. As can be seen from comparing FIGS. 30 and 31, the image pixel labeled P(1,1) in FIG. 31 corresponds to the photosensor labeled PH(1,1) in FIG. 30. The image pixel labeled P(582, 752) in FIG. 31 corresponds to the photosensor labeled PH(582,752) in FIG. 30. The photosensors of the photosensor array 202 are read out in a frame mode interlaced format which means at a time t1, photosensors in every other row of the photosensor array are read out (e.g., rows 1, 3, 5, . . . , 581) to generate a first captured image field comprising 219,584 image pixels. At a later time t2, photosensors in the other rows are read out (e.g., rows 2, 4, 6, . . . , 582) to generate a second captured image field comprising 219,584 image pixels. The images represented in the first and second captured image fields, when appropriately interlaced in a row by row fashion comprise a full captured image frame comprising 439,168 image pixels.

Imaging Target Area 104 and the Optic Assembly 300

Figure 8:
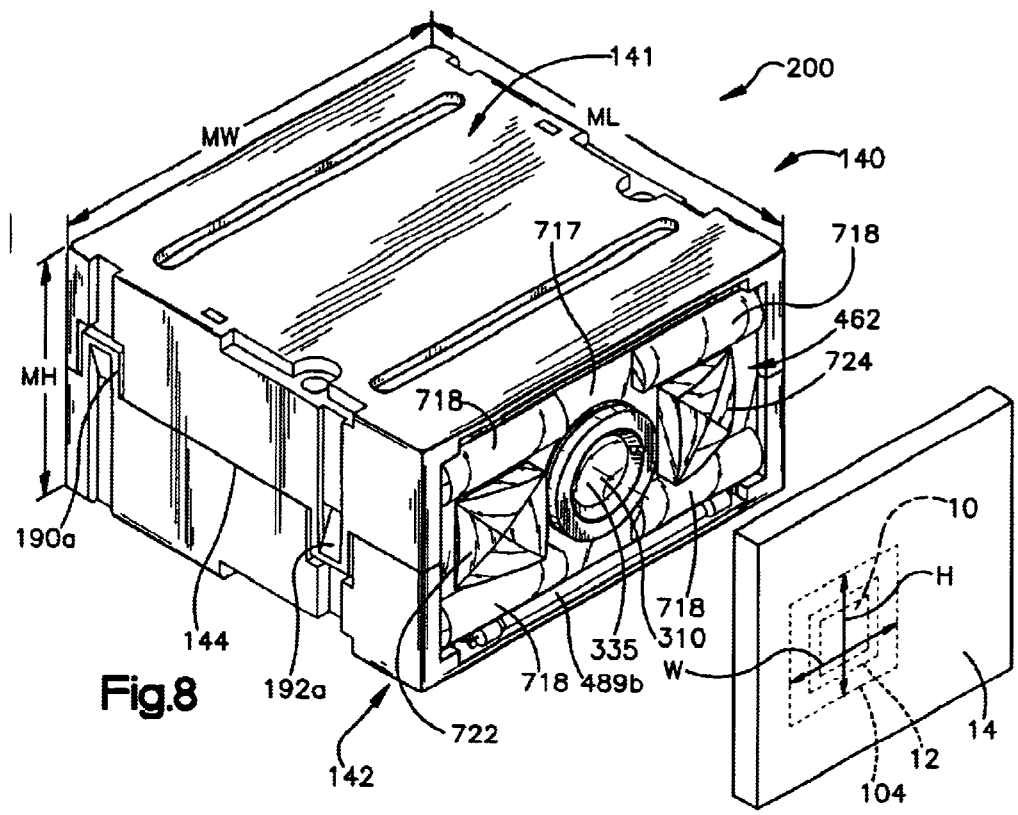
FIG. 8 is a perspective view of a modular camera assembly of an imaging assembly of the portable data collection device of the present invention, the modular portion shown imaging a target dataform affixed to a target item.
Figure 10:
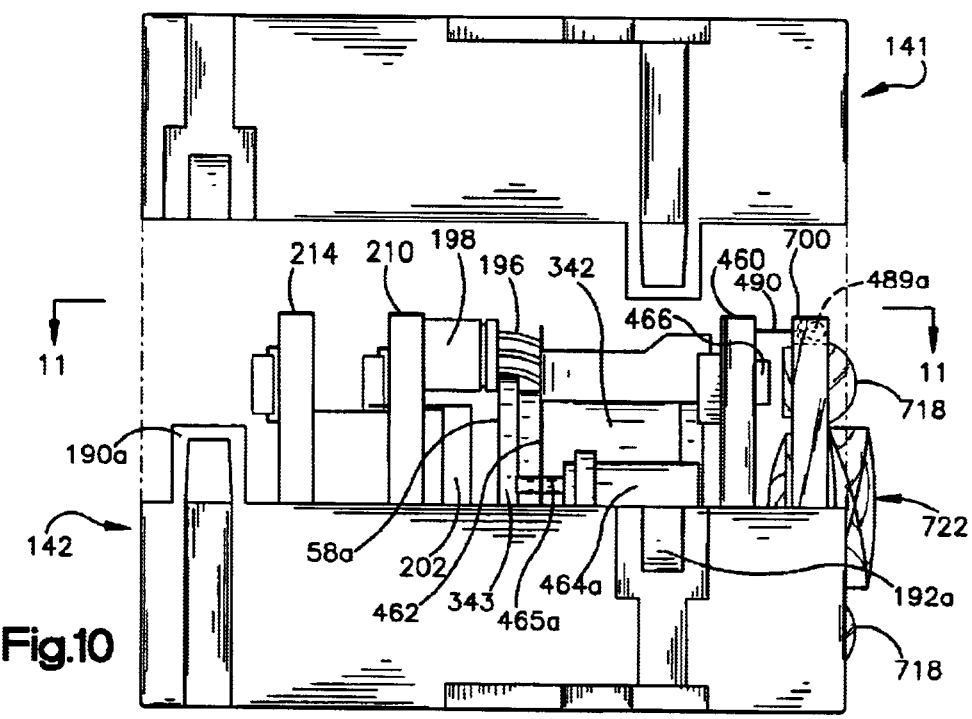
FIG. 10 is a side elevation view of the modular camera assembly of FIG. 8 with an upper half of the housing removed.

The imaging target area 104 is defined by a field of view and a depth of view of the modular camera assembly 200 and is represented in FIG. 8 by the dimensions labeled "H" (for height of imaging target area 44) and "W" (for width of the imaging target area 44). The lenses of optic assembly 300 define both the field of view and the depth of view of the target area 152.

The optic assembly 300 of the present invention is specifically configured to permit reading by the imaging assembly 102 of standard density dataforms having a minimum cell size of 6.6 mils (0.0066 in. or 0.167 mm.). The minimum cell size of a dataform is defined as the smallest dimension of a separately readable information conveying portion of the dataform.

FIG. 14 shows a cross section of the camera assembly 38 with the optic assembly 300 focusing an image of the imaging target area 104 onto the photosensor array 202. The performance of the portable data collection device 100 is enhanced by the optic assembly 300 which enables imaging and decoding of dataforms with a minimum cell size of 6.6 mil (0.168 mm.). The optic assembly 300 includes a shroud assembly 302 (FIGS. 9 and 15) and a lens assembly LA (FIG. 14). The lens assembly LA includes lenses L1, L2, L3, L4 and a spacer member SP1 with a small central aperture A1 (1.17 mm. in diameter) all supported within an inner cylindrical shroud 304 (best seen in FIG. 9). The lens assembly LA also includes a lens L5 which is supported by an upper surface of the photosensor array IC chip support 208. Thus, there are eleven optic surfaces (including the portion of the spacer member SP1 defining the aperture A1) labeled 310, 312, 314, 316, 318, 320, 322, 324, 326, 328, 330 in FIG. 14. The outer optic surface 310 of the outermost lens L1 of the optic assembly 300 includes an ultraviolet filter coating 340 which blocks ultraviolet illumination from passing through the optic assembly and permits only light in the visible spectrum to be focused on the photosensor array 202.

The shroud assembly 302 also includes a lock nut 340 and an outer shroud 342. The lock nut 340 includes internal threads 344 which thread onto external threads 346 of the inner shroud 304. When the lock nut 340 is properly positioned on inner shroud threads 346, the inner shroud 304 is threaded into internal threads 348 of the outer shroud 342. When assembled, the forward facing surface 350 of the lock nut 340 abuts a back surface 160b of a printed circuit board 160. As will be explained below, the outer shroud 342 is securely held in place by a second support 182 of the upper and lower housing portions 141, 142 of the board camera modular housing 140 thereby insuring a proper perpendicular angle relationship between an optical axis through the optic centers of each of the lenses L1, L2, L3, L4 and the outward facing, light receiving surface 204 of the photosensor array 202.

Additionally, the lock nut 340 facilitates precise positioning of the lenses L1, L2, L3, L4 of the lens assembly LA with respect to the longitudinal displacement of the lenses along an optical axis labeled A—A in FIG. 11. The precise positioning of the lenses L1, L2, L3, L4, L5 with respect to the photosensor array 202 permits the sharpest possible image of the target dataform 10 to be directed on the center point CP of the light receiving surface 404 of the photosensor array 202. As can best be seen in FIG. 15, an O-ring 352 is disposed in a annular groove in the outer surface of the inner shroud 304. The O-ring 352 seals against a central opening 720 of the lens array 62 to prevent external contaminants from entering the interior region 146 of the modular housing 140.

Turning to FIG. 14, based on the distance between the optic assembly 300 and the photosensor array 202, for a given dataform minimum cell size or dimension, there exists a best focus position S2 in front of the forward-most surface 90 of the lens L1 of the optic assembly 300 at which an image of the target dataform 10 in the imaging target area 104 will be focused sharpest on a center point CP of the light receiving surface 204 of the photosensor array 202. The image sharpness gradually degrades as the target dataform 10 is moved from the best focus position inwardly towards a near field cut off distance S1 or away toward a far field cut off distance S3. At the near field and far field cut off distances S1, S3, the target dataform 10 having the specified minimum cell size is still capable of being decoded. However, at distances less than S1 or greater than S3, the imaging assembly 102 will no longer be able to decode the target dataform 10.

As noted above, the imaging target area 104 is defined by an angular field of view and a depth of the field of view. The horizontal and vertical angular field of view of optic assembly 300 is 32° (horizontal)×24° (vertical). This corresponds to a 40° diagonal field of view. The horizontal angular field of view is shown schematically as an angle labeled with the designation A in FIG. 14. The depth of the field of view is defined by the near field and far field cut off distances S1 and S3. The cut off distances are set forth below for a number of different dataform minimum cell sizes. At the S1 and S3 distances, a dataform having the specified minimum cell size can still be decoded by the imaging assembly 102. For a minimum cell size of 15 mil, the S2 best focus working distance is 140 mm. (5.5 in.).

The preferred optic assembly 300 includes four lenses L1, L2, L3, L4 and the plastic spacer member SP1 separating lenses L2 and L3. The lenses L1, L2, L3, L4 and the spacer member SP1 are supported in the inner shroud 304 of the shroud assembly 302. A flat lens L5 is mounted on an upper surface of the photosensor array IC chip 206 and overlies the light receiving surface 204 of the photosensor array 202. Features of the optic assembly 300 include:

| Field of view | 32° (Horizontal) × 24° (Vertical) |
| --- | --- |
| | 82 mm. (3.2 in.) × 62 mm. (2.4 in.) at a working distance of 140 mm. (5.5 in.) |
| Minimum decode cell size | 6.6 mil |
| Ambient light | total darkness to full sun light |
| Spectral range | 400–700 nm. |
| Focal length | 8 mm. |
| F-number | 9 |
| Image size | 4.8 mm. (Horizontal) × 3.6 mm. (Vertical) |
| Resolution | MTF > 50% @ 50 cyc/mm |
| Distortion | 1% |

Image size refers to the size of the image projected onto the photosensor array light receiving surface 204.

The working range of the optic assembly 300 with respect to reading 15 mil. dataforms is as follows:

| Cell size | Min. working distance S1 | Max working distance S3 | Pitch | Skew | Rotation |
| --- | --- | --- | --- | --- | --- |
| 15 mil. | 65 mm. (2.5 in.) | 290 mm. (11.5 in.) | 15° | 15° | 360° |

The field of view or imaging target area 104 of the optic assembly 300 at the best focus distance S2 of 140 mm. (5.5 in.) and at the minimum and maximum working distances S1, S3 are as follows:

| Distance | Width | Height |
| --- | --- | --- |
| S1 | 37 mm. (1.5 in.) | 28 mm. (1.1 in.) |
| S2 | 82 mm. (3.2 in.) | 62 mm. (2.4 in.) |
| S3 | 166 mm. (6.5 in.) | 123 mm. (4.9 in.) |

The optic prescriptions for each of the optic surfaces of the optic assembly 300 are as follows:

| Optic Surface | Radius of Surface Curvature | Diameter | Share |
| --- | --- | --- | --- |
| 310 | 10.093 mm. | 7 mm. | Concave |
| 312 | 3.635 mm. | 7 mm. | Concave |
| 314 | 6.995 mm. | 7 mm. | Convex |
| 316 | 5.834 mm. | 7 mm. | Convex |
| 318 (Flat) Infinity - Pinhole diameter | 1.171 mm. | 7 mm. | Flat |
| 320 | 25.116 mm. | 7 mm. | Concave |
| 322 | 5.834 mm. | 7 mm. | Concave |
| 324 | 13.499 mm. | 7 mm. | Convex |
| 326 | 4.325 mm. | 7 mm. | Convex |
| 328 (Flat) | Infinity | 7 mm. | Flat |
| 320 (Flat) | Infinity | 7 mm. | Flat |

The distance between successive optical surfaces 310–320 is as follows:

| Optic Surface | Distance |
| --- | --- |
| 310–312 | 0.529 mm. |
| 312–314 | 0.609 mm. |
| 314–316 | 2.389 mm. |
| 316–318 | 1.714 mm. |
| 318–320 | 2.114 mm. |
| 320–322 | 0.599 mm. |
| 322–324 | 0.366 mm. |
| 324–326 | 2.482 mm. |
| 326–328 | 7.27 mm. |
| 328–330 | 0.60 mm. |
| 330–Photosensor | 1.31 mm. |

Where "Photosensor" is the light receiving surface 204 of the photosensor array 202. The glass type for each lens L1, L2, L3, L4, L5 of the lens assembly LA is as follows:

| Lens | GLASS TYPE | REFRACTIVE INDEX |
| --- | --- | --- |
| L1 | SF5 Schott | 1.67270 |
| L2 | RAFD13 Hoya | 1.85540 |
| L3 | SF11 Schott | 1.78472 |
| L4 | LAK21 Schott | 1.64050 |
| L5 | BK7 Schott | 1.51289 |

The lenses L1, L3, L4, L5 are available from Schott Glass Technologies, Inc. of Duryea, Pa. The lens L2 is available from Hoya Corp USA, Optics Division located in San Jose, Calif.

Targeting and Illumination Assembly 400

The targeting and illumination assembly 400 includes the illumination assembly 410 and the targeting assembly 450. The illumination assembly 410 includes two illumination sources, the first or visible light source 412 and the second or ultraviolet light source 414. When the imaging assembly 102 is energized by an operator depressing the trigger 126, the targeting illumination assembly 400 is activated producing an illumination pattern (described below) to aid in aiming the device 100. The visible light source 412 is also energized to enable imaging of the first dataform 16 while the ultraviolet light source 414 remains deenergized. The visible light source 412 and the targeting illumination assembly 450 are alternately energized.

The targeting illumination causes "hot spots" of high illumination intensity in portions of the target area 104 and reflected glare. Thus, image frames generated when the targeting illumination is energized are not suitable for decoding of the dataform 10 imaged therein. Image frames generated when the targeting illumination assembly 450 is deenergized and the first visible light source 412 is energized are characterized by uniformity of illumination intensity across the target area 104. Such image frames are suitable for decoding the first dataform 16 of the dataform 10.

The cells of the dataform 10 imprinted with visible ink absorb the visible illumination. The cells of the dataform 10 which are not imprinted with any ink (non-inked cells) reflect the illumination from the visible light source 412 because of the white color of the label 12. The ultraviolet active ink does not effect the reflectivity of illumination in the visible spectrum. Therefore, cells of the dataform 10 imprinted with only the ultraviolet active ink also reflect the visible illumination emitted by the visible light source 412 just like the non-inked cells.

Thus, the image focused on the photosensor array 202 when the dataform 10 is in the target area 104 of the imaging assembly 102 corresponds to the first dataform 16, that is, the image includes dark areas corresponding to cells of the dataform 10 having visible ink and light areas corresponding to cells of the dataform having either no ink or only ultraviolet active ink imprinted thereon. As mentioned above, the targeting illumination assembly 450 is intermittently deenergized so that a captured image frame to be processed and decoded does not have any illumination "hot spots" and interfering reflected glare from the label 12.

After the image of the first dataform 16 is successfully processed and decoded, the first or visible light source 412 is deenergized and the second or ultraviolet light source 414 is energized to enable imaging of the second dataform 18. As with the visible illumination source 412, the ultraviolet light source 414 and the targeting illumination assembly 410 are alternately energized milliseconds. Thus, an image frame captured during deenergization of the targeting illumination assembly does not have any illumination "hot spots" or reflected glare and the imaged dataform which is the second dataform 18 is suitable to be processed and decoded. The cells of the dataform 10 imprinted with ultraviolet active ink fluoresce when exposed to the ultraviolet illumination and generate illumination in the visible spectrum. The non-ink cells of the dataform 10 and the visible ink only cells of the dataform 10 reflect most of the illumination from the ultraviolet light source 414.

As discussed above, the outer optic surface 310 of the outermost lens L1 of the optic assembly 300 includes a coating 340 that functions as an ultraviolet light filter, that is, the coating blocks ultraviolet illumination from passing through the optic assembly and permits only light in the visible spectrum to be focused on the photosensor array 202. Thus, the visible light emitted by the fluorescence of the ultraviolet active ink cells is focused on the photosensor array 202. Consequently, the image focused on the photosensor array 202 when the dataform 10 is in the target area 104 of the imaging assembly 102 corresponds to a negative of the second dataform 16, that is, the image focused on the photosensor array 202 includes light areas corresponding to cells of the dataform 10 that are imprinted with the ultraviolet active ink and further includes dark areas corresponding to cells of the dataform 10 having either no ink or visible ink only.

It should be noted however, that in the first dataform 16, the dark cells corresponded to the cells of the dataform imprinted with the dark visible ink and the light-colored cells corresponded to the non-inked cells of the dataform. In the image of the second dataform 18 focused on the photosensor array 202, the reverse is true, that is, the light-colored cells corresponded to the cells of the dataform imprinted with the ultraviolet active ink and the dark cells corresponded to the non-inked cells of the dataform. That is why the image focused on the photosensor array 202 is referred to as the negative of the second dataform 18.

Image processing circuitry 285 (discussed below) of the imaging assembly 102 takes this contrast reversal into account when decoding the image of the second dataform. As before, the targeting assembly 450 is intermittently deenergized so that a captured image frame to be processed and decoded does not have any interfering reflected glare from the label 12. The actuation and deactuation (turning on and off) of components of the imaging assembly 102 is performed by control and selection circuitry 284 (FIG. 29A) which is part of signal and image processing circuitry 250 all of which operates under the control of a microprocessor 251.

Figure 32:
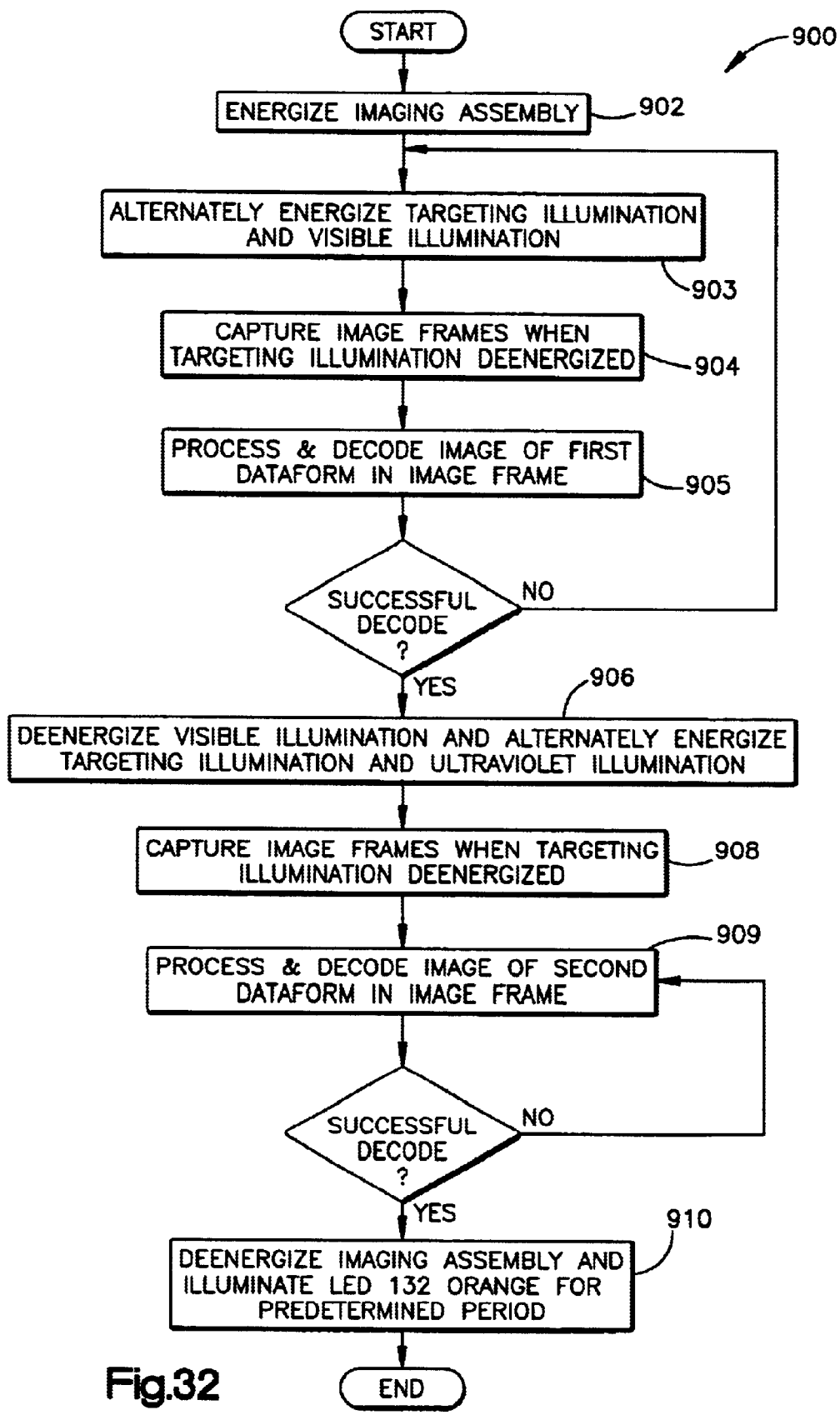
FIG. 32 is a flow chart for reading (imaging and decoding) of the two dataforms comprising the composite dataform.

In FIG. 32, a flow chart is shown at 900 which sets forth the processing sets associated with reading the dataform 10, that is, sequentially imaging and decoding the first dataform 16 and the second dataform 18. Upon the operator depressing the dataform reading trigger 126, at step 902, the imaging assembly 102 is actuated and, at step 903, the targeting illumination is alternately energized with the visible illumination source 412. Assuming the device 100 is properly aimed at the dataform 10, at step 904, target area image frames including the first dataform 16 are captured. As noted above, only image frames captured during periods when the targeting illumination was off are suitable for processing and decoding. At step 905, a suitable image frame is processed and an attempt is made to decode the imaged first dataform 16.

If the first dataform 16 is decoded, at step 906, the visible illumination source is deenergized and the ultraviolet illumination source 414 is alternately energized with the targeting illumination. Again assuming the device 100 is properly aimed at the dataform 10, at step 908, target area image frames including the second dataform 16 are captured. As noted above, only image frames captured during periods when the targeting illumination was off are suitable for processing and decoding. At step 909, a suitable image frame is processed and an attempt is made to decode the imaged second dataform 18. Upon successful decoding of the second dataform 18, at step 910, the imaging assembly 102 including the targeting illumination and the ultraviolet illumination source 414 are turned off and the LED 132 is energized to display an orange color to notify the operator that the reading of the dataform 10 has been successfully completed.

As is clear from the above explanation, the visible illumination source 412, the ultraviolet light source 414 and the targeting illumination assembly 450 are actuated or energized by the control and selection circuitry 284 on a mutually exclusive basis.

The first or visible illumination source 412 comprises four banks of four red light emitting diodes (LEDs) 466. The visible illumination LEDs 466 emit red color illumination in the visible range at a wavelength of approximately 660 nm. Each bank of LEDs is focused through corresponding illumination optic portions 488a, 488b, 488c, 488d which project a uniform intensity distribution of illumination across the imaging target area 104. Suitable red surface mount LEDs are available as Part No. MTSM735K-UR or MTSM745KA-UR from MarkTech Corporation of Lathar, N.Y.

The second or ultraviolet illumination source 414 comprises two miniature ultraviolet lamps 489a, 489b. As can best be seen in FIGS. 9 and 18, the ultraviolet lamps 489a, 489b are mounted to the front surface 460a of the printed circuit board 460, lamp 489a being mounted horizontally near the top of the front surface 460a and the lamp 489b being mounted horizontally near the bottom of the front surface 460a. The lamps are connected to the printed circuit board front surface 460 via relatively stiff supports 490. The supports 490 position the ultraviolet lamps 489a, 489b away from the circuit board 460. Conductive leads 491 extending from one end of each lamp to the circuit board front surface 460a are used to energize the lamps.

The lamps 489a, 489b fit into horizonal cut outs in a lens array 700. Thus, when lamps 489a, 489b are energized, ultraviolet light is cast on the target area. Extending from the lens array 700 into the cut out region are curved reflectors 704 which aid in focusing the ultraviolet illumination onto the imaging target area 104. Suitable miniature ultraviolet lamps 489a, 489b are available from JKL Components Corporation of Pacoima, Calif. 91331. One suitable lamp is Part No. BF727-UV2 which has a peak spectral output at a wavelength of 254 nm. and is 27 mm. in length and 7 mm. in diameter.

The targeting assembly 450 also includes a targeting arrangement including targeting LEDs 482a, 482b, which, when energized, project illumination through first and second targeting optics 484a, 484a thereby generating a crosshair targeting illumination pattern CR to aid in aiming the device 100. To avoid image distortion, the targeting pattern CR is intermittently turned off by the imaging assembly 102 when the image frames of the imaging target area 104 are being captured. In FIG. 26, the crosshair illumination pattern CR is shown aimed at a 2D bar code dataform 10'. The dataform 10' is imprinted on a label 12' affixed to a product 14'.

The targeting and illumination assembly 400 includes a printed circuit board 460 and the lens array 700. The lens array 700 functions as the outer or front panel of the modular camera assembly 200. The term "front panel" will be used interchangeably with the term "lens array" throughout. The lens array 700 is a single piece acrylic or polycarbonate, preferably fabricated of PMMA (polymethyl methacrylate), and is positioned between the printed circuit board assembly 460 and the target area 104 (FIGS. 8 and 9) for directing the illumination from the four banks of visible illumination LEDs 466 toward the target area 104. The visible illumination LEDs 466 are disposed on the front surface of printed circuit board 460 to direct illumination through the lens array 700 towards the imaging target area 104.

The flexible printed circuit board 463, which route power to the targeting LEDs 464a, 464b, is also electrically coupled to the circuit board 460. The flexible printed circuit board 463 has a central u-shaped cut out region 463c to provide clearance for the outer shroud of the shroud assembly 302. The targeting LEDs 464a, 464b, when energized, project targeting illumination through openings 468 in the circuit board 460 and through targeting optics 722, 724 of the lens array 700 to form the crosshairs light or illumination pattern CR which aids in aiming the device 100 at the target dataform 10.

Because the desired working range and field of view of the portable data collection device 100 dictates that the optic assembly 43 have a large F number (F# 9), the visible illumination assembly 410 must provide adequate illumination of the imaging target area 104 during the exposure period so that enough light is absorbed by the photosensor array 202 to generate a suitably bright image. However, the exposure period is normally limited to 0.01 seconds or less to minimize the smear effect of an operator's hand jittering during a dataform reading session. Therefore, the illumination assembly 410 must provide adequate illumination to accommodate the large F# and short exposure time.

The printed circuit board assembly 460 includes printed conductors and conductive leads 196 including a power lead operative for supplying power to the illumination LEDs 466 and the ultraviolet lamps 489a, 489b. Each illumination LED 466 provides illuminosity of 285 milli candela (mcd) over an angular illumination field of about 68 degrees. The small footprint of each illumination LED 466 enables four LEDs to be placed in a row measuring less than 14 mm. The printed circuit board assembly 460 includes four banks of four illumination LEDs 466 totaling sixteen illumination LEDs providing at least 4560 mcd of uniform illumination over the target area 104 at the best focus distance S2.

The lens array 700 includes four illumination optic portions 708a, 708b, 708c, 708d (FIGS. 9 and 18) each of which are aligned with a corresponding bank of illumination LEDs 466. The illumination optic portions 708a, 708b, 708c, 708d direct a 68 degree angular illumination field from each illumination LED 466 into a uniform field having an angular field of view horizontally and vertically which substantially corresponds to the angular field of view horizontally and vertically of the optic assembly 300 which defines the imaging target area 104.

Referring to FIGS. 23 and 25, which show a horizontal cross section (FIG. 23) and a vertical cross section (FIG. 25) through the illumination optic portions 708a, 708b, 708c, 708d, it can be seen that each optic portion comprises a lens including four vertically oriented cylindrical entry optic surfaces 716 extending from a back side 717 (FIG. 23) of the lens array 700. One vertically oriented cylindrical entry surface 716 is positioned in front of a corresponding LED 466.

Each optic portion 708a, 708b, 708c, 708d also includes a horizontally oriented cylindrical optic exit surface 718 extending from a front side 719 (FIG. 23) of the lens array 700. One horizontally oriented cylindrical exit optic surface 718 is positioned, in front of each bank of four LEDs 466.

The vertically oriented cylindrical entry optic surfaces 716 define the horizontal field of illumination and the horizontally oriented cylinders 718 define the vertical field of illumination. This arrangement provides an even illumination intensity distribution across the target area 104. The 4560 mcd of illumination provided by the illumination LEDs 466 will provide an illumination intensity in excess of 106 lux at the far field cut off distance S3 of 290 mm. (11.5 in.) for 15 mil minimum cell size dataforms. The vertically oriented entry surfaces 716 have a radius of curvature of 1.50 mm. and a height I (FIG. 35) of 4.00 mm. while the horizontally oriented exit surfaces 718 have a radius of curvature of 3.0 mm. and a width J (FIG. 36) of 13.75 mm. Referring to FIGS. 21–23, suitable dimensions for the lens array 700 are as follows:

| Label | Description | Dimension |
|-------|-------------|-----------|
| A | Height of lens array 700 | 21.75 mm. |
| B | Width of lens array 700 | 39.55 mm. |
| C | Diameter of center opening 720 of lens array 700 | 12.00 mm. |
| D | Height between middle of vertical entry surfaces 716 | 14.13 mm. |
| E | Thickness of lens array 700 | 1.95 mm. |

Referring again to FIG. 18, the targeting and illumination assembly 400 also includes a targeting arrangement or assembly to aid in aiming the device 100 at the target dataform 10; The targeting illumination assembly 450 includes the targeting LED illuminators 464a, 464b, which extend into apertures 468 in the printed circuit board assembly 460 and, when energized, project illumination into first and second targeting optics 722, 724 respectively of the lens array 700. The first and second targeting optics 722, 724 are mirror images of each other and are identical in configuration. Each targeting optic generates a crosshair pattern of illumination CR1, CR2 (seen in FIGS. 18 and 26) and if the target dataform 10 is at a proper distance for imaging, i.e., at the best focus position S2 of the optic assembly 300, the crosshairs CR1, CR2 will coincide or overlap producing a single rectangular crossing or crosshair pattern of illumination CR (FIGS. 18 and 26). The rectangular illumination pattern CR will have a height h of 62 mm. (2.4 in.) and a width w of 82 mm. (3.2 in.) (FIG. 18) at the best focus position S2 (140 mm.). The rectangular illumination pattern CR substantially corresponds to the target area 104 of the optic assembly 300 at the best focus position S2. Of course, the rectangular illumination pattern CR will not be a perfect intersecting line crosshair but rather will be characterized by an illumination intensity distribution or pattern having some visible "thickness" t (FIG. 18), but will nonetheless be suitable for aiming the device 100.

The first and second targeting optics 722, 724, which are identical in configuration, are shown in cross section in FIGS. 24 and 25. The first targeting optics 722 comprises a lens with an aspherical light entry optic surface 726 and a segmented cylindrical light exit optic surface 728. The second targeting optics 724 comprises a lens with an aspherical light entry optic surface 730, similar to the aspherical light entry optic surface 726, and a segmented cylindrical light exit optic surface 732, similar to the segmented cylindrical light exit optic surface 728.

The aspherical entry surfaces 726, 730 each have a diameter of 8 mm., a radius of curvature of 2.890 mm. and a conic constant of −2.534. The segmented cylindrical light exit surfaces 728, 732 each have an 8.0 nm. by 8.0 mm. square shaped outer perimeter. The segmented cylindrical surface 728 is comprised of. four triangular shaped sections 740, 742, 744, 746 (FIG. 21) while the segmented cylindrical surface 732 is divided into four triangular shaped sections 750, 752, 754, 756, wherein the optic surfaces of sections 740 and 750 are identical, the optic surfaces of sections 742 and 752 are identical, the optic surfaces of sections 744 and 754 are identical and the optic surfaces of sections 746 and 756 are identical.

Upper and lower triangular sections 740, 744 comprise vertically oriented cylindrical light exit optic surfaces. Left and right triangular sections 742, 746 comprise horizontally oriented cylindrical light exit optic surfaces. Similarly, upper and lower triangular sections 750, 754 comprise vertically oriented cylindrical light exit optic surfaces, while left and right triangular sections 752, 756 comprise horizontally oriented cylindrical light exit optic surfaces. The vertically oriented cylindrical optic surfaces 740, 744, 750, 754 have a radius of curvature of 25.00 mm. Similarly, the horizontally oriented cylindrical optic surfaces have a radius of curvature of 25.00 mm.

As can best be seen in FIG. 24, the horizontally and vertically oriented cylindrical optic surfaces 742, 746, 740, 744 are tipped at an angle c with respect to a longitudinal axis L—L though the lens array 700 and, therefore, is also tipped at an angle c with respect to the target area 104 (that is, parallel to the plane defined by the generally flat front surface 717 of the lens array 700). The tip angle c of the horizontally oriented cylindrical optic surfaces 742, 746 shifts the horizontal position of the illumination rectangle or targeting crosshair CR1 (schematically shown in FIG. 18) generated by the first targeting optics 722 such that it is horizontally centered in the target area 104 while the tip angle c of the vertically oriented cylindrical optic surfaces 740, 744 shifts the vertical position of the targeting crosshair CR1 generated by the first targeting optics 722 such that it is vertically centered in the imaging target area 104. A suitable tip angle of c is 9.83 degrees.

Similarly, as can also be seen in FIG. 24, the horizontally and vertically oriented cylindrical optic surfaces 752, 756, 750, 754 are also tipped at an angle c which is preferably 9.83 degrees with respect to a longitudinal axis L—L though the lens array 700. Note that the direction of tilt of the segmented cylindrical light exit surfaces 728, 732 are the same in magnitude but opposite in a direction of tilt, that is, the light exit surface 728 of the first targeting optics 722 slants downwardly to the left toward the front side 719 in FIG. 24, while the light exit surface 732 of the second targeting optics 724 slants downwardly to the right toward the front side 719 in FIG. 37. Also note that the two horizontally oriented light exit optic surfaces 718 which would be seen in FIG. 24 have been removed for clarity of the drawing. It should also be noted that FIG. 20 which shows the segmented cylindrical light exit surface 732 as being comprised of four individual exploded "pieces" is only a representation to provide additional clarity as to the shape and tilt of the four light exiting surfaces 750, 752, 754, 756. The lens array 700 is fabricated as a single piece and the targeting optics 722, 724 and illumination optics 716, 718 are formed in the single piece. The lens optics are not fabricated by "piecing" together individual optics as might be assumed in looking at FIG. 20.

Additional suitable dimensions, labeled on FIG. 24, for the aspheric light entry surfaces 726, 730, the segmented cylindrical light exit surfaces 728, 732 of the lens array 700 are as follows

| Label | Description | Dimension |
|-------|-------------|-----------|
| F | Maximum extension of aspheric light exit surfaces 726, 730 from back side 717 of lens array | 1.75 mm. |
| G | Distance between maxinium extension of aspheric light exit surfaces 726, 730 and center of respective segmented light exit surfaces 728, 732 along centerlines T-T | 5.25 mm. |
| H | Distance between centerlines T-T and outer edge of lens array 700 | 7.80 mm. |

Targeting Illumination Crosshairs CR1, CR2

As noted above, the best focus distance S2 is 140 mm. (5.5 in.). If the device 100 is oriented such that generally flat front surface 717 of the lens array 700 is substantially parallel to a surface of the target dataform 10 and positioned at the best focus distance S2 from the target, then the targeting crosshairs CR1 and CR2 will coincide and generate the single targeting crosshair CR as shown in FIG. 26 having an approximate height h of 62 mm. (2.4 in.) and an approximate width w of 82 mm. (3.2 in.) which substantially corresponds to the target area 44 height of 62 mm. and width of 82 mm. at the best focus position S2 of 140 mm. (5.5 in.) in front of the optic surface 310 of lens L1.

If the device 100 is moved away from the best focus distance S2 with respect to the target dataform 10, the targeting crosshairs CR1 and CR2 will separate horizontally as shown in FIG. 27 thereby informing the operator that the distance of the device 100 from the target dataform 10 is not correct for best imaging or imaging and decoding. Finally, if the lens array 700 is not substantially parallel to a surface of the target dataform 10, that is, the device 100 is tilted forward or backward from a position where the front surface 717 of the lens array or front panel 700 is parallel to the target surface, the vertical portions of the illumination patterns of CR1 and CR2 will be angularly shifted or displaced as shown in FIG. 28, the greater the angle of tilt of the device 100, the greater will be the angular shifting of the vertical portions of the illumination patterns CR1, CR2.

As was noted above, the targeting LEDs 464a, 464b are alternately turned off by the imaging assembly control and selection circuitry 284 to provide for capture of image frames not subject to possible image distortion caused by glare from the targeting LEDs reflecting off the target dataform 10.

Modular Camera Assembly Housing 140

The modular board camera assembly 200 is shown in FIGS. 8–13B. Suitable exterior dimensions for the two piece housing 140 of the board camera assembly 200 are as follows:

| Housing | Label | Dimension |
|---|---|---|
| Height | MH (FIG. 8) | 1.02 in. (26 mm.) |
| Width | MW (FIG. 8) | 1.65 in. (42 mm.) |
| Length | ML (FIG. 8) | 1.57 in. (40 mm.) |

The modular board camera housing 140 includes an upper portion 141 and a symmetrical lower portion 142. The upper and lower portions 141, 142 are advantageously identically shaped and positioned symmetrically about a part line 144 and define an interior region 146 (FIG. 9) in which components of the modular camera assembly 200 are supported. Since the upper and lower portions 141, 142 are symmetrical, only the construction of the lower portion 142 will be discussed with the understanding that the same construction and features are present in the mating upper portion 141. In this way, fabrication and assembly of the modular camera assembly 200 is simplified because the housing portions 141, 142 are interchangeable and, therefore, only one configuration needs to be fabricated.

As can best be seen in FIGS. 9, 12, 13a and 13b, the housing lower portion 142 includes a substantially flat base 150 and three side walls 152, 154, 156 extending perpendicularly from the base 150. An inner surface of the side wall 152 includes two spaced apart slots 160a, 162a extending from an upper edge 164 of the housing lower portion 142 defined by the side walls 152, 154, 156 to an inner surface 166 of the base 150. Similarly, an inner surface of the side wall 156 includes matching spaced apart slots 160b, 162b extending from the upper edge 164 of the housing lower portion 142 to the inner surface 166 of the base 150.

The modular camera assembly 200 includes circuitry mounted on a set of two parallel, spaced apart front and rear printed circuit boards 210, 214 affixed to a spacer element 215 (FIGS. 11 and 14). The slots 162a, 162b receive and securely hold the rear printed circuit board 214 (FIG. 11) while the slots 160a, 160b receive the front printed circuit board 210. Mounted on a front surface 212 of the front printed circuit board 210 is the 2D photosensor array IC chip 206. The optic assembly 300 must be precisely aligned with the photosensor array 202 to insure proper imaging of the imaging target area 104. Spring-like projections 170a, 170b (FIGS. 9 and 12) extend upwardly from the base inner surface 166. As can best be seen in FIG. 12, the projections 170a, 170b are spaced from their respective side walls 152, 156 but are still within regions defined by the slots 160a, 160b.

Figure 13A:
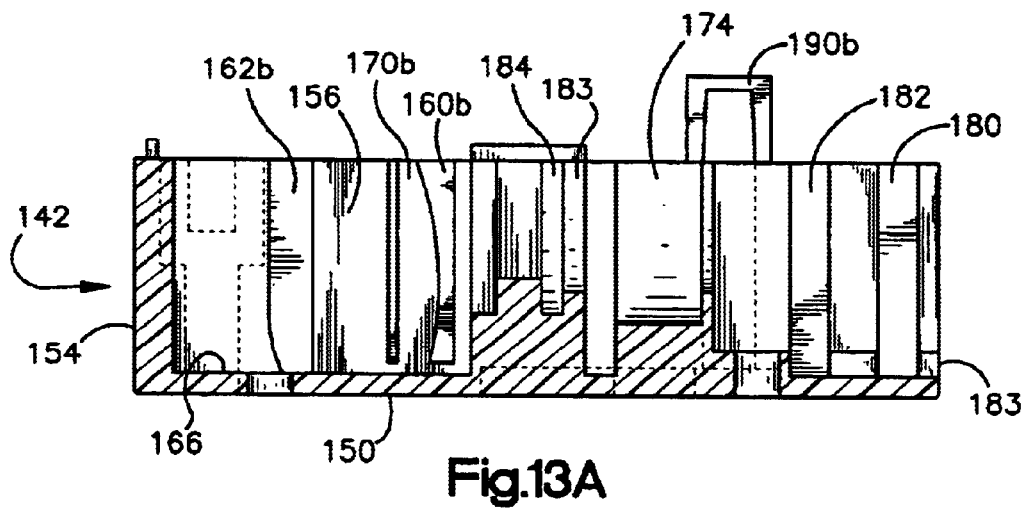
FIG. 13A is a sectional view of the lower half of the modular camera assembly housing as seen from a plane indicated by the line 13A—13A in FIG. 12.

When the printed circuit boards 210, 214 are inserted in their respective slots 162a, 162b, 160a, 160b, the projections 170a, 170b flex and push in a horizontal direction against a back side 213 (FIG. 11) of the printed circuit board 210 in a direction labeled F to insure the boards 210, 214 are securely held in place and the photosensor array 202 is precisely located. Additionally, as can be seen in FIGS. 12 and 13A, the slots 162a, 162b are tapered adjacent the base inner surface 166.

The slots 162a, 162b become narrower near the base 150 thereby forcing the printed circuit board 214 in the direction F. The taper of the slots 162a, 162b combined with the projections 170a, 170b in the slots 160a, 160b apply sufficient force to the printed circuit boards 210, 214 so as to eliminate any "play" of the front and rear printed circuit boards 210, 214 in their respective slots.

The housing lower portion 142 also includes first and second supports 172, 182 extending upwardly from a slightly raised portion 167 (FIG. 12) of the base inner surface 166. As can best be seen in FIGS. 9, 11 and 12, the first support 172 includes a central portion 174 with a semicircular recess flanked by two outerlying portions 175a, 175b having smaller semicircular recesses. The central portion 174 supports an outer shroud 342 of the optic assembly 300. The two smaller outerlying portions support respective targeting light emitting diodes 473a, 473b of the targeting illumination assembly 450. The targeting LEDs 464a, 464b are cylindrically shaped and include enlarged diameter base portions 465a, 465b (best seen in FIG. 11) which fit into inwardly stepped semicircular recesses 176a, 176b of the outerlying portions 175a, 175b. A first end portion 183 of the second support 182 includes a semicircular recess which supports the outer shroud 342. Just inward of the end portion 183 is a portion 184 (FIGS. 12 and 13A) defining another semicircular recess having a slightly larger diameter than the recess of the end portion 183. The portion 184 is sized to receive an outwardly flared end portion 343 of the outer shroud 342 and thereby position it precisely with respect to the photosensor array 202. The outwardly flared end portion 343 of the outer shroud 342 includes two small cut out portions 354 (only one of which can be seen in FIG. 9). One of the cut out portions 354 fits onto a raised nub 185 of the semicircular shaped portion 184 to prevent the outer shroud 342 from rotating within the housing 240. The other cut out portion 354, of course, fits onto an identical nub (not shown) of the upper housing portion 141 which is identical in shape and configuration to the lower housing portion 142.

Figure 13B:
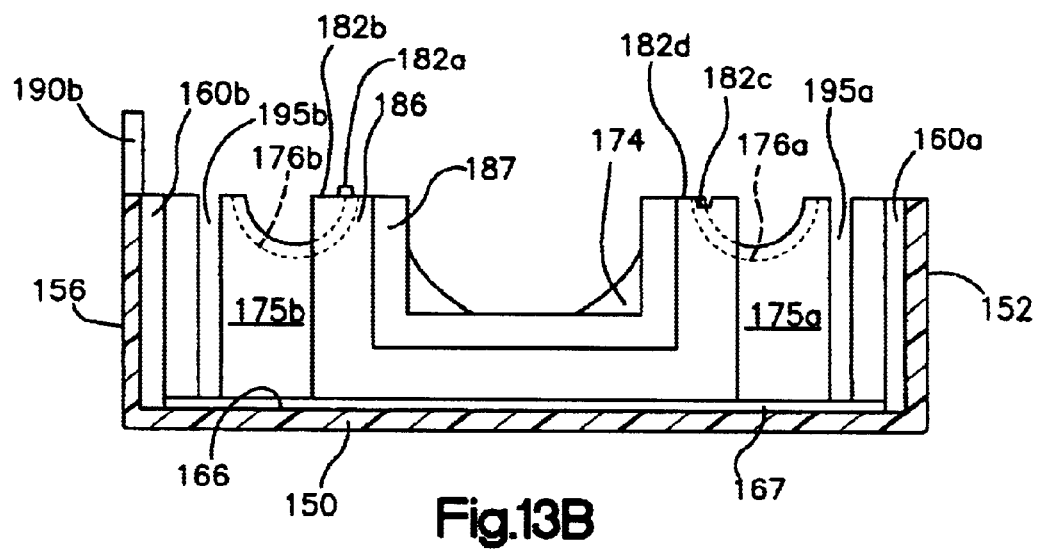
FIG. 13B is another sectional view of the lower half of the modular camera assembly housing as seen from a plane indicated by the line 13B—13B in FIG. 12.

As can best be seen in FIG. 13B, a second end portion 186 of the second support 182 includes a rectangular shaped recess. Disposed between the second end portion 186 and the portion 184 is a portion 187 (FIGS. 12, 13A and 13B) defining a rectangular shaped recess that is slightly smaller size than the recess defined by the end portion 186. As can be seen in FIG. 11, the recess of the portion 184 receives an extending portion of the photosensor array IC chip support 208. The photosensor array chip support 208 is mounted to the front surface 212 of the printed circuit board 210. The front surface 212 of the printed circuit board 210 abuts the second support end portion 186 and, thus, the light receiving surface 204 of the photosensor array 202 is precisely positioned with respect to the support and with respect to the optic assembly 300 both in terms of a distance between the lens L5 of the optic assembly and photosensor array 202 and the perpendicularity between a longitudinal axis through the lenses L1, L2, L3, L4 and the light receiving surface 204 of the photosensor array 202. The light receiving surface 202 is coincident with the image plane of the optic. assembly 300.

The shroud assembly outer shroud 342 and the second support 182 function to prevent ambient light from impinging on the photosensor array light receiving surface 204. When the housing upper and lower portions are 141, 142 are assembled, the second support 182 of the two portions encircle the outer shroud end 343 and the photosensor array light receiving surface 204.

Figure 9:
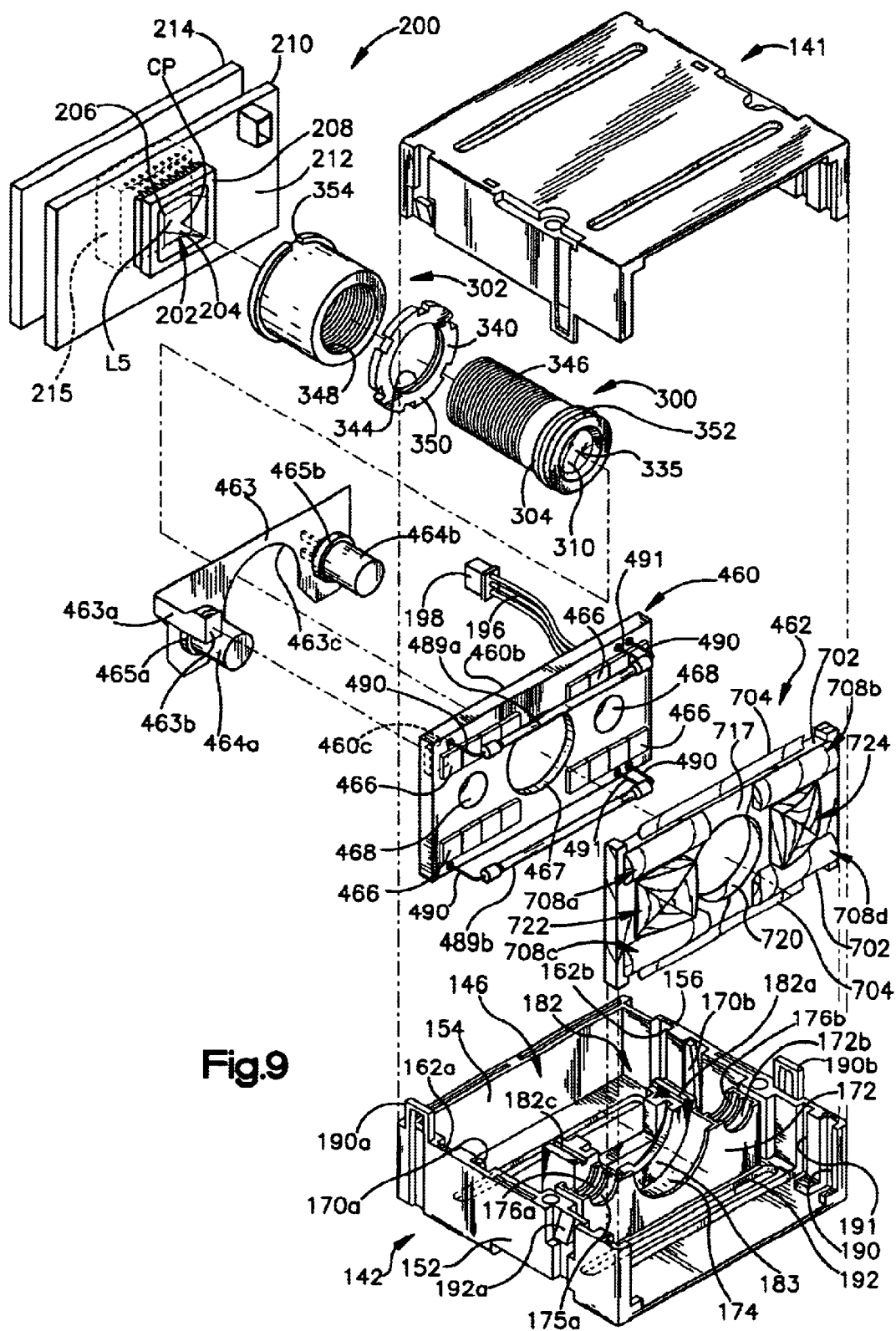
FIG. 9 is an exploded perspective view of the modular camera assembly of FIG. 8.

As can be seen in FIGS. 9, 12 and 13B, a raised ledge 182a extends upwardly from an upper surface 182c of one side of the second support 182. A mating recess 182c is formed in an upper surface 182d of the opposite side of the second support 182. When the upper and lower housing portions 141, 142 are assembled, the raised ledge 182a of the lower housing portion 142 is received in a mating recess in an upper surface of a second support of the upper housing portion 140. The mating recess of the upper housing portion 141, of course, is identical to the recess 182c of the lower housing portion 142 as the portions 141, 142 are identical in configuration. Similarly, the mating recess 182c of the lower housing portion 142 receives a raised ledge of an upper surface of the second support of the upper housing portion. The raised ledge of the upper housing portion 141, of course is identical to the raised ledge 182a of the lower housing portion 142. The interlocking of the respective raised ledges 182a and mating recesses 182c of the second supports 182 of the housing upper and lower portions 141, 142, insure the area between an end 58a of the shroud assembly 302 and the photosensor array support 208 is light tight. In addition to preventing ambient light from impinging on the photosensor array 202, the second support 182 of the housing upper and lower portions 141, 142 support the shroud assembly 58 and insure that the optical axis A—A through the centers of the lenses L1, L2, L3, L4 and the pinhole aperture A1 of the spacer member SP1 is perpendicular to the light receiving surface 204 of the photosensor array 202 and is also aligned with the center point CP of the photosensor array 202.

The housing lower portion 142 includes two u-shaped latches 190a, 190b extending upwardly from the upper edge 164 of the respective side walls 152, 156 and two tapered detents 192a, 192b in recessed portions of the side walls 152, 156 that engage similar detents and latches of the upper portion 141 to seal the mating upper and lower housing portions 141, 142. As can be seen in FIG. 8, the two latches 190a, 190b engage respective detents in the housing upper portion 140 corresponding to the detents 192a, 192b of the housing lower portion. Similarly, the detents 192a, 192b are engaged by u-shaped latches of the upper portion. The latches are flexible enough to deflect as they traverse their respective tapered detents and then snap into engagement position once the central openings of the detents pass the opposing detents.

The lower housing 142 includes to apertures 194a, 194b (FIGS. 11 and 12) which align with identical apertures of the upper portion 141 to facilitate affixing the module 20 within the housing extending snout 16. The circuit board 460 supports the surface mount illumination LEDs affixed to the front surface 460a of the board 460. When the housing upper and lower portions 141, 142 are assembled, ventilation of the electronic components supported therein including the board camera assembly circuitry 201 and the targeting and illumination assembly 400 is provided by two elongated openings 192, 193 (FIG. 12).

Two slots 195a, 195b (as seen in FIGS. 12 and 13B) are disposed between the two outerlying portions 175a, 175b and portions of the side walls 152, 156 surrounding apertures 194a, 194b. One of the slots 195a, 195b provide a passageway for a plurality of conductive leads 196 extending between a conductor 470 affixed to a back side 460b of the circuit board 460 and a conductor 198 affixed to the front side 212 of the first circuit board 210 of the board camera assembly 200. The other of the slots provides a passage for an angled extending portion 463a (FIG. 18) of a flexible printed circuit board 463. The circuit board 463, typically referred to as "circuit on flex", electrically connects the leads 465c, 465d extending rearwardly from the targeting LEDs 464a, 464b with circuitry on the circuit board 460 to permit selective energization of the LEDs 464a, 464b to aid in aiming the device 100 at the target dataform 10. A front section 463b of the flexible printed circuit board 463 is coupled to the circuitry on the circuit board 460 through a connector 470 disposed on the back side 460b of the circuit board 460.

Image Processing of the Imaging Assembly 102

Figure 29A:
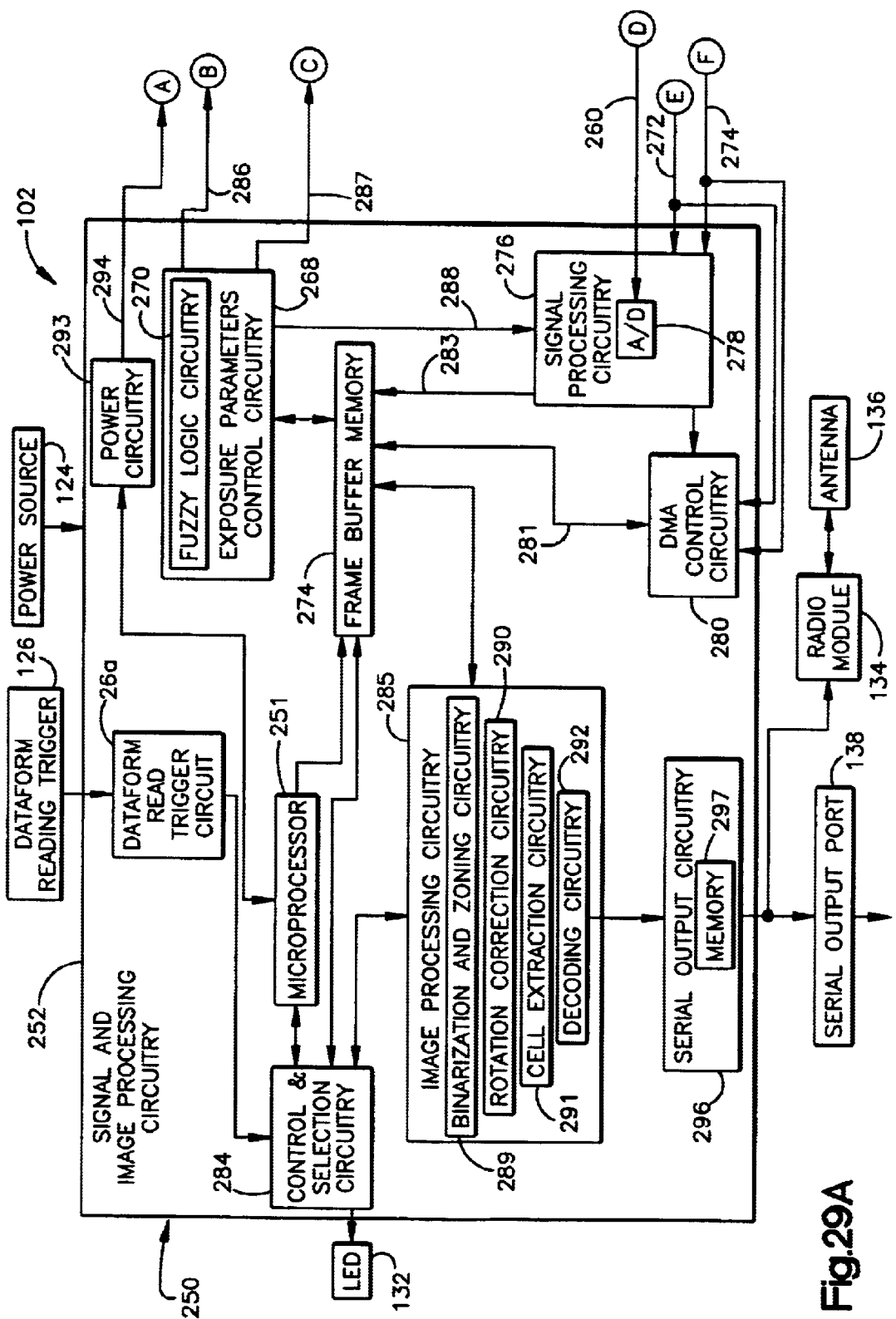
FIG. 29A is one portion of a block diagram of selected circuitry of the portable data collection device of the present invention.
Figure 29B:
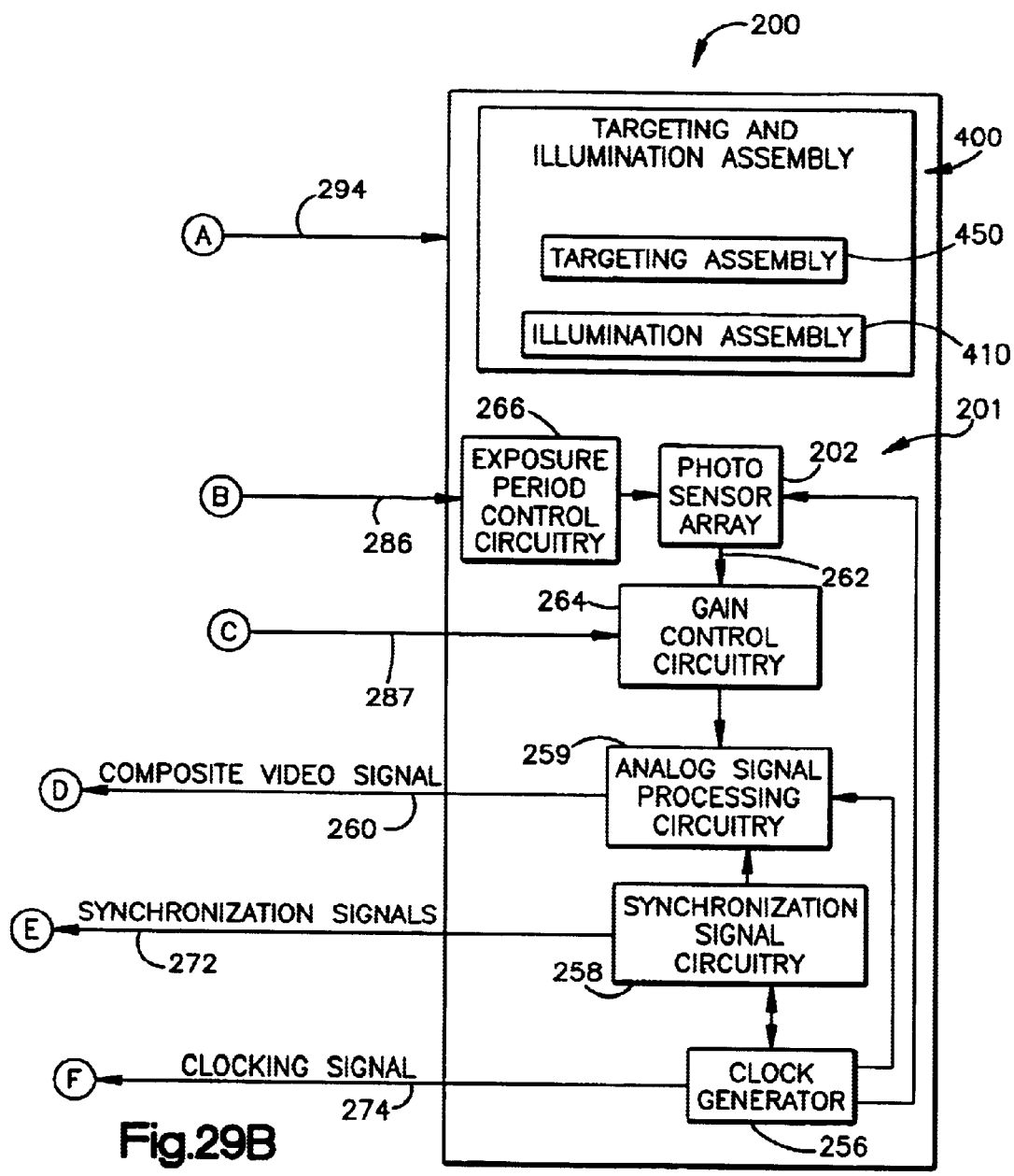
FIG. 29B is a second portion of a block diagram of selected circuitry of the portable data collection device of the present invention, the second portion matching the first portion shown in FIG. 29A.

In the preferred embodiment of the portable data collection device 100, the photosensor array 202 is part of the modular board camera assembly 200 commercially available from such vendors as Sharp or Sony of Japan. Referring to FIGS. 29A and 29B, the camera assembly 200, when activated, generates a composite video signal 260. The board camera assembly 38 also includes a clock generator 256, synchronization signal circuitry 258 and analog signal processing circuitry 259 for reading illumination intensity values out of each photosensor of the photosensor array 202 and generating the composite video signal 260.

The intensity of light incident on individual pixels or photosensors of the photosensor array 202 varies somewhat uniformly from very bright (whitest areas of the image) to very dark (darkest areas of the image). The preferred 2D photosensor array 202 comprises an interlaced 752 by 582 matrix array of photodiode photosensors or image pixels (for a total of 437,664 pixels). The clock generator 256 coupled to a crystal oscillator and generates asynchronous clocking signals to read out charges accumulating on individual photosensors over an exposure period. The charges on the photosensors are read out through CCD elements adjacent the photosensor array photosensors. The charges are converted to a voltage signal 262 wherein temporal portions of the voltage signal represent the changes accumulated on each photosensor. One CCD element is provided for reading out the charges on two photosensors thus two read outs of the photosensor array comprise one full image frame, the frame being comprised of two interlaced fields.

The camera assembly 200 generates the composite analog video signal 260 (FIG. 29A) corresponding to consecutive fields of the image incident on the photosensor array 202. The video signal 260 is termed "composite" because it includes synchronization signals generated by the synchronization signal circuitry 258 which correlate portions of the video signal to particular photosensors, interspersed among image signal portions wherein the signal magnitude represents charges on individual photosensors read out from a given row of the photosensor array 202.

The board camera assembly 200 also includes gain control circuitry 264 for controlling amplification of the voltage image signal 262 and exposure period control circuitry 266 for controlling a duration of an exposure period of the pixels. Both the exposure period control circuitry 266 and the gain control circuitry 264 are controlled by exposure parameters control circuitry 268 including fuzzy logic circuitry 270.

The synchronization signals 268 generated by synchronization signal circuitry 258, the clock signal 270, generated by the clock generator 256, and the composite video signal 260 are output to signal processing circuitry 264 on the control and decoder board 252. Because the signal and image processing circuitry 250 is configured to receive a composite video signal, it should be appreciated that selection of the board camera assembly circuitry 201 for generating the composite video signal 260 are not critical to the present invention.

Under the control of a microprocessor 251 mounted on the control and decoder board 252, the video signal 260 is input to the signal processing circuitry 276 along with clocking signals 274 and synchronization signals 272. The signal processing circuitry 276 includes synchronization extractor circuitry which receives the clocking signals 274 and the synchronization signals 272 and generates signals which are coupled to analog to digital converter circuitry (A/D converter circuitry) 278 causing the A/D converter circuitry to periodically digitize the video signal 260. The A/D converter circuitry 278 includes an A/D converter generating an 8 bit value representing the illumination incident on a pixel of the array.

Direct memory access (DMA) control circuitry 280 receives the synchronization signals 272 and clock signals 274 and generates address signals 281 coupled to the frame buffer memory 282 to indicate a storage location for each value generated by the A/D converter circuitry 278. Data signals 283 representing the values generated by the A/D converter circuitry 278 are coupled to the frame buffer memory 282.

The microprocessor 251 also controls operation of control and selection circuitry 284 and image processing circuitry 285 which are mounted on the control and decoder board 252. Coupled to the control and selection circuitry 284 are the dataform read trigger circuit 126a which, in turn, is coupled to the dataform reading trigger 126.

The exposure parameters control circuitry 268 which outputs control signals 286, 287 to the exposure period control circuitry 266 and the gain control circuitry 264 of the camera assembly 200 and a reference voltage signal 288 embodying an appropriate set of reference voltages for operating the A/D converter 278. The exposure parameters control circuitry 268 includes the fuzzy logic circuitry 270 which analyzes captured frames of data accessed from the frame buffer memory 282. The fuzzy logic circuitry 270 analyzes a captured frame to determines if the current exposure period of the 2D photosensor array 202, the current amplification of the video signal 262 by the gain control circuitry 264 and the reference voltages used by the A/D converter circuitry 278 are resulting in an "acceptable" captured image frame. If not, the control signal 286 is changed to adjust the exposure period of the 2D photosensor array 202 and/or the control signal 287 is changed to adjust the amplification of the video signal 262 and/or the signal 288 is changed to adjust the operation of the A/D converter circuitry 278. After the adjustment, another captured frame is analyzed by the fuzzy logic circuitry 270 and, if necessary, further adjustments are made in an iterative fashion until the camera assembly 200 produces an "acceptable" captured image. A suitable exposure parameter control circuit including fuzzy logic control circuitry is disclosed in U.S. Pat. No. 5,702,059, issued Dec. 30, 1997, which has previously been referenced.

The frame buffer memory 282 is provided to store digital gray scale values (represented by line 283 in FIG. 29A) generated by the A/D converter circuitry 278 from the composite video signal 260. The gray scale values are processed by image processing circuitry 285. The image processing circuitry 285 includes binarization and zoning circuitry 289, rotation correction circuitry 290, cell extraction circuitry 291 and decoding circuitry 292. The binarization and zoning circuitry 289, rotation correction circuitry 290, cell extraction circuitry 291 and decoding circuitry 292 operate under the control of the microprocessor 251 as disclosed in U.S. application Ser. No. 08/961,096, filed Oct. 30, 1997 now U.S. Pat. No. 5,992,425 Jul. 17, 2000 and entitled "Portable Data Collection Device with Binarization Circuitry." application Ser. No. 08/961,096 is assigned to the assignee of the present invention and is incorporated in its entirety herein by reference.

As can be seen in FIGS. 14 and 29A, the power source 124 is coupled to the control and decoder board 252 to provide operating power to the microprocessor 251 and other circuitry mounted on the board and the radio module 140 operating under the control of the microprocessor 251. Power circuitry 293, also operating under the control of the microprocessor 251 is coupled through a lead 294 to the targeting and illumination assembly 400 and the circuitry 201 of the board camera assembly 200 to supply power to these components of the imaging assembly 102.

As can best be seen in FIGS. 29A and 29B, the imaging assembly 102 includes the board camera assembly 200 which is electrically coupled to the control and decoder board 252. The control and decoder board 252 includes the microprocessor 251 and associated circuitry. The circuitry of the imaging assembly 102 may by embodied in software resident in one or more RAM or ROM memory chips (not shown) mounted on the control and decoder board 252 and operated by the microprocessor 251. Alternately, the circuitry of the imaging assembly 102 may comprise separate application-specific integrated circuitry (ASIC) mounted on the control and decoder board 252.

Decoded dataform data may be stored in the frame buffer memory 282 for later downloading via the serial port 138 via serial output circuitry 296 and buffer memory 297 or transmitted to the radio module 140 for rf communication to a remote host computer (not shown).

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

What is claimed is:

1. A dataform reader for a portable data collection device, the dataform reader utilizing a single two dimensional imaging assembly adapted to independently image and decode first and second overlying dataforms, the first dataform being imaged when illuminated by illumination having a first wavelength and the second dataform being imaged when illuminated by illumination having a second wavelength, the first and second wavelengths being different, the dataform reader comprising:

a) the single two dimensional imaging assembly including a two dimensional photosensor array, the imaging assembly actuatable to generate a signal representative of an image of a target area of the imaging assembly, the target area image resulting from an illumination pattern received from the target area;
   b) the imaging assembly including signal and image processing circuitry for processing and decoding an image of a dataform positioned in the target area;
   c) an optic assembly positioned with respect to the imaging assembly to focus the reflected illumination from the target area onto the photosensor array;
   d) an illumination assembly including a first illumination source energizable to generate illumination having a first range of wavelengths and a second illumination source energizable to generate illumination having a second range of wavelengths, the first range of wavelengths including the first wavelength and not including the second wavelength and the second range of wavelengths including the second wavelength and not including the first wavelength, the first and second illumination sources being positioned to illuminate the target area when actuated;
   e) control and selection circuitry electrically coupled to the imaging assembly and the illumination assembly to actuate the imaging assembly and selectively energize the first illumination source to image and decode the first dataform and to actuate the imaging assembly and selectively energize the second illumination source to image and decode the second dataform;
   f) wherein the first illumination source illuminates the target area with illumination having a spectral output centered about a wavelength in the visible spectrum; and
   g) wherein the control and selection circuitry deenergizes the second illumination source while the first illumination source is energized and deenergizes the first illumination source while the second illumination source is energized.

2. The dataform reader of claim 1 where the second illumination source illuminates the target area with illumination having a spectral output centered about a wavelength in the ultraviolet spectrum.

3. The dataform reader of claim 1 wherein the first illumination source comprises red light emitting diodes.

4. The dataform reader of claim 1 wherein the first illumination source illuminates the target area with illumination having a spectral output centered about a wavelength of substantially 660 nanometers.

5. The dataform reader of claim 1 wherein the second illumination source illuminates the target area with illumination having wavelengths in the ultraviolet spectrum.

6. The dataform reader of claim 5 wherein the second illumination source illuminates the target area with illumination having a spectral output centered about a wavelength of substantially 254 nanometers.

7. The dataform reader of claim 6 wherein the second illumination source comprises an ultraviolet lamp.

8. The dataform reader of claim 1 wherein the optics assembly includes a ultraviolet light filter to prevent illumination having wavelengths in the ultraviolet spectrum from being focused onto the photosensor array.

9. The dataform reader of claim 1 wherein the two dimensional photosensor array, the optics assembly and the illumination assembly are supported by a modular housing, the photosensor array being supported within an internal region of the modular housing.

10. A dataform reader for a portable data collection device, the dataform reader utilizing a single two dimensional imaging assembly adapted to independently image and decode first and second overlying dataforms, the first dataform being imaged when illuminated by illumination having a first wavelength and the second dataform being imaged when illuminated by illumination having a second wavelength, the first and second wavelengths being different, the dataform reader comprising:

a) the single two dimensional imaging assembly including a two dimensional photosensor array, the imaging assembly actuatable to generate a signal representative of an image of a target area of the imaging assembly, the target area image resulting from an illumination pattern received from the target area;
   b) the imaging assembly including signal and image processing circuitry for processing and decoding an image of a dataform positioned in the target area;
   c) an optic assembly positioned with respect to the imaging assembly to focus the reflected illumination from the target area onto the photosensor array;
   d) an illumination assembly including a first illumination source energizable to generate illumination having a first range of wavelengths and a second illumination source energizable to generate illumination having a second range of wavelengths, the first range of wavelengths including the first wavelength and not including the second wavelength and the second range of wavelengths including the second wavelength and not including the first wavelength, the first and second illumination sources being positioned to illuminate the target area when actuated;
   e) control and selection circuitry electrically coupled to the imaging assembly and the illumination assembly to actuate the imaging assembly and selectively energize the first illumination source to image and decode the first dataform and to actuate the imaging assembly and selectively energize the second illumination source to image and decode the second dataform; and
   f) wherein the signal representative of the target area image is a composite video signal and the signal and image processing circuitry further includes:
      1) signal processing circuitry receiving the composite video signal and converting a portion of the signal corresponding to an image frame into a set of digital data representative of an image of the target area, the set of digital data including a plurality of digital data values corresponding to respective different image pixels of the imaged target area, each of the plurality of digital data values comprising a plurality of bits; and 2) digital signal processing circuitry selectively actuatable to receive the set of digital data generated by the signal processing circuitry, the digital signal processing circuitry including binarization and zoning circuitry to:
   i) convert selected digital data values in the plurality of digital data into a set of binary data values, a single bit binary data value being generated for each digital data value;
   ii) identify a subset of binary data values of the set of binary data values corresponding to an image of the target object; and
   iii) processing the identified subset of binary data values to generate a set of output data.

11. The dataform reader of claim 10 wherein the signal and image processing circuitry further includes cell extraction and decoding circuitry selectively actuatable to operate on the identified subset of binary data values to generate decoded dataform data corresponding to an imaged dataform.

12. The dataform reader of claim 10 wherein the imaging assembly further includes a targeting illumination assembly electrically coupled to the control and selection circuitry, the control and selection circuitry periodically energizing and deenergizing the targeting illumination assembly to provide targeting illumination to aid in aiming the device at a dataform.

13. The dataform reader of claim 12 wherein the targeting illumination assembly is deenergized when either of the first or the second illumination sources are energized.

14. A portable data collection device comprising:
   a) a housing defining an interior region;
   b) a dataform reader assembly at least partially supported within the housing interior region, the dataform reader assembly including a single two dimensional imaging assembly adapted to independently image and decode first and second overlying dataforms, the first dataform being imaged when illuminated by illumination having a first wavelength and the second dataform being imaged when illuminated by illumination having a second wavelength, the first and second wavelengths being different, the dataform reader assembly including:
      1) the single two dimensional imaging assembly including a two dimensional photosensor array, the imaging assembly actuatable to generate a signal representative of an image of a target area of the imaging assembly, the target area image resulting from an illumination pattern received from the target area;
      2) the imaging assembly including signal and image processing circuitry for processing and decoding an image of a dataform positioned in the target area;
      3) an optic assembly positioned with respect to the imaging assembly to focus the target area image onto the photosensor array;
      4) an illumination assembly including a first illumination source energizable to generate illumination having a first range of wavelengths and a second illumination source energizable to generate illumination having a second range of wavelengths, the first range of wavelengths including the first wavelength and not including the second wavelength and the second range of wavelengths including the second wavelength and not including the first wavelength, the first and second illumination sources being positioned to illuminate the target area when actuated, the first illumination source generating illumination having a spectral output centered about a wavelength in the visible spectrum; and
      5) control and selection circuitry electrically coupled to the imaging assembly and the illumination assembly to actuate the imaging assembly and selectively energize the first illumination source to image and decode the first dataform and to actuate the imaging assembly and selectively energize the second illumination source to image and decode the second dataform, the second illumination source being deenergized while the first illumination source is energized and the first illumination source being deenergized while the second illumination source is energized.

15. The portable data collection device of claim 14 wherein the second illumination source illuminates the target area with illumination having a spectral output centered about a wavelength in the ultraviolet spectrum.

16. The portable data collection device of claim 14 wherein the first illumination source comprises red light emitting diodes.

17. The portable data collection device of claim 16 wherein the first illumination source illuminates the target area with illumination having a spectral output centered about a wavelength of substantially 660 nanometers.

18. The portable data collection device of claim 14 wherein the second illumination source illuminates the target area with illumination having wavelengths in the ultraviolet spectrum.

19. The portable data collection device of claim 18 wherein the second illumination source illuminates the target area with illumination having a spectral output centered about a wavelength of substantially 254 nanometers.

20. The portable data collection device of claim 18 wherein the second illumination source comprises an ultraviolet lamp.

21. The portable data collection device of claim 14 wherein the optics assembly includes a ultraviolet light filter to prevent illumination having wavelengths in the ultraviolet spectrum from being focused onto the photosensor array.

22. The portable data collection device of claim 14 wherein the two dimensional photosensor array, the optics assembly and the illumination assembly are supported by a modular housing, the photosensor array being supported within an internal region of the modular housing.

23. A portable data collection device comprising:
   a) a housing defining an interior region;
   b) a dataform reader assembly at least partially supported within the housing interior region, the dataform reader assembly including a single two dimensional imaging assembly adapted to independently image and decode first and second overlying dataforms, the first dataform being imaged when illuminated by illumination having a first wavelength and the second dataform being imaged when illuminated by illumination having a second wavelength, the first and second wavelengths being different, the dataform reader assembly including:
      1) the single two dimensional imaging assembly including a two dimensional photosensor array, the imaging assembly actuatable to generate a signal representative of an image of a target area of the imaging assembly, the target area image resulting from an illumination pattern received from the target area;

2) the imaging assembly including signal and image processing circuitry for processing and decoding an image of a dataform positioned in the target area;
3) an optic assembly positioned with respect to the imaging assembly to focus the target area image onto the photosensor array;
4) an illumination assembly including a first illumination source energizable to generate illumination having a first range of wavelengths and a second illumination source energizable to generate illumination having a second range of wavelengths, the first range of wavelengths including the first wavelength and not including the second wavelength and the second range of wavelengths including the second wavelength and not including the first wavelength, the first and second illumination sources being positioned to illuminate the target area when actuated; and
5) control and selection circuitry electrically coupled to the imaging assembly and the illumination assembly to actuate the imaging assembly and selectively energize the first illumination source to image and decode the first dataform and to actuate the imaging assembly and selectively energize the second illumination source to image and decode the second dataform; and c) wherein the signal representative of the target area image is a composite video signal and the signal and image processing circuitry further includes:
1) signal processing circuitry receiving the composite video signal and converting a portion of the composite video signal corresponding to an image frame into a set of digital data representative of an image of the target area, the set of digital data including a plurality of digital data values corresponding to respective different image pixels of the imaged target area, each of the plurality of digital data values comprising a plurality of bits; and
2) digital signal processing circuitry selectively actuatable to receive the set of digital data generated by the signal processing circuitry, the digital signal processing circuitry including binarization and zoning circuitry to:
   i) convert selected digital data values in the plurality of digital data into a set of binary data values, a single bit binary data value being generated for each digital data value;
   ii) identify a subset of binary data values of the set of binary data values corresponding to an image of the target object; and
   iii) process the identified subset of binary data values to generate a set of output data.

24. The portable data collection device of claim 23 wherein the signal and image processing circuitry further includes cell extraction and decoding circuitry selectively actuatable to operate on the identified subset of binary data values to generate decoded dataform data corresponding to an imaged dataform.

25. The portable data collection device of claim 23 wherein the imaging assembly includes a targeting illumination assembly electrically coupled to the control and selection circuitry, the control and selection circuitry periodically energizing and deenergizing the targeting illumination assembly to provide targeting illumination to aid in aiming the device at a dataform.

26. The portable data collection device of claim 25 wherein the targeting illumination assembly is deenergized when either of the first or the second illumination sources are energized.

* * * * *

UNITED STATES PATENT AND TRADEMARK OFFICE
CERTIFICATE OF CORRECTION

PATENT NO. : 6,669,093 B1
DATED : December 30, 2003
INVENTOR(S) : Robert F. Meyerson and Chen Feng It is certified that error appears in the above-identified patent and that said Letters Patent is hereby corrected as shown below:

Title page,
Item [73], Assignee, change "Telxon Corporation" to -- Symbol Technologies, Inc. --.

Signed and Sealed this

Tenth Day of August, 2004

JON W. DUDAS
*Acting Director of the United States Patent and Trademark Office*